(12) United States Patent
Harada et al.

(10) Patent No.: US 10,913,658 B2
(45) Date of Patent: Feb. 9, 2021

(54) CARBON DIOXIDE REMOVAL USING LITHIUM BORATE

(71) Applicant: Massachusetts Institute of Technology, Cambridge, MA (US)

(72) Inventors: Takuya Harada, Cambridge, MA (US); Trevor Alan Hatton, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/003,778

(22) Filed: Jun. 8, 2018

(65) Prior Publication Data

US 2018/0354807 A1     Dec. 13, 2018

Related U.S. Application Data

(60) Provisional application No. 62/517,791, filed on Jun. 9, 2017.

(51) Int. Cl.

| | | |
|---|---|---|
| *C01B 35/12* | (2006.01) | |
| *B01D 53/62* | (2006.01) | |
| *B01J 20/04* | (2006.01) | |
| *B01J 20/28* | (2006.01) | |
| *B01D 53/02* | (2006.01) | |

(52) U.S. Cl.
CPC .......... *C01B 35/121* (2013.01); *B01D 53/62* (2013.01); *B01J 20/04* (2013.01); *B01J 20/28004* (2013.01); *B01D 53/02* (2013.01); *B01D 2251/302* (2013.01); *B01D 2251/304* (2013.01); *B01D 2251/306* (2013.01); *B01D 2251/40* (2013.01); *B01D 2251/60* (2013.01); *B01D 2257/504* (2013.01); *B01D 2258/01* (2013.01); *B01D 2258/0283* (2013.01); *B01J 2220/42* (2013.01); *C01P 2004/61* (2013.01)

(58) Field of Classification Search
None
See application file for complete search history.

(56) References Cited

U.S. PATENT DOCUMENTS

| | | | |
|---|---|---|---|
| 4,971,605 A | 11/1990 | Tarman | |
| 5,709,800 A * | 1/1998 | Ross | A62D 3/20 210/762 |
| 2011/0035154 A1 | 2/2011 | Kendall et al. | |
| 2011/0144244 A1* | 6/2011 | Lee | C08L 23/06 524/84 |

(Continued)

FOREIGN PATENT DOCUMENTS

| | | |
|---|---|---|
| CN | 102895847 A | 1/2013 |
| CN | 107029538 A | 8/2017 |

(Continued)

OTHER PUBLICATIONS

Pfeiffer et al.; alpha to gamma Lithium borate Phase Transition produced during the CO2 Chemisorption Process; J Therm Anal Calorim; 110: 807-811; 2012.*

(Continued)

*Primary Examiner* — Guinever S Gregorio
(74) *Attorney, Agent, or Firm* — Wolf, Greenfield & Sacks, P.C.

(57) ABSTRACT

Carbon dioxide removal using lithium borate is generally described.

14 Claims, 8 Drawing Sheets

(56) References Cited

U.S. PATENT DOCUMENTS

| | | | |
|---|---|---|---|
| 2011/0177013 A1* | 7/2011 | Feng | A61K 8/19 |
| | | | 424/53 |
| 2012/0128559 A1 | 5/2012 | Olsen | |
| 2013/0298532 A1 | 11/2013 | Hamad et al. | |
| 2017/0165633 A1 | 6/2017 | Harada et al. | |

FOREIGN PATENT DOCUMENTS

| | | |
|---|---|---|
| DE | 19528734 C1 | 8/1996 |
| EP | 2933014 A1 | 10/2015 |
| JP | 53-105700 A | 9/1978 |
| WO | WO 2014/015243 A1 | 1/2014 |
| WO | WO 2018/066751 A1 | 4/2018 |

OTHER PUBLICATIONS

Arslan et al.; Aerosol Route Synthesis of Lithium Borate Spheres Using Lithium Nitrate and Boric Acid Solution; Supplemental Proceedings: vol. 3: General Paper Selections TMS, 2011.*
Maslyuk et al.; A Potential Model for Single Crystals of the $Li_2O$—$B_2O_3$ System Based on Non-Equivalence of Boron Atoms; Eur. Phys. J. B 41, 281-287; 2004.*
Defintion of sequester; Merriam-Webster; May 30, 2020.*
Avalos-Rendon et al., $CO_2$ chemisorption and cyclability analyses of lithium aluminate polymorphs ($\alpha$- and $\beta$-$Li_5AlO_4$). Ind Eng Chem Res. 2012;51:2622-30. Epub Jan. 20, 2012.
Memon et al., Alkali metal $CO_2$ sorbents and the resulting metal carbonates: Potential for process intensification of sorption-enhanced steam reforming. Environ Sci Technol. 2017;51:12-27. Epub Dec. 7, 2016.
Roman-Tejeda et al., $\alpha \rightarrow \gamma$ Lithium borate phase transition produced during the $CO_2$ chemisorption process. J Therm Anal Calorim. 2012;110:807-11. Epub Nov. 2, 2011.
PCT/US2018/036650, Aug. 20, 2018, International Search Report and Written Opinion.
Rees et al., Electrochemical $CO_2$ sequestration in ionic liquids; a perspective. Energy Environ Sci. Nov. 11, 2010;4:403-8.
International Search Report and Written Opinion dated Aug. 20, 2018 for Application No. PCT/US2018/036650.
Al Sadat et al., The $O_2$-assisted Al/$CO_2$ electrochemical cell: A system for $CO_2$ capture/conversion and electric power generation. Sci Adv. Jul. 20, 2016;2:e1600968(1-10).
Avalos-Rendon et al., High $CO_2$ chemisorption in $\alpha$-$Li_5AlO_4$ at low temperatures (30-80 °C): Effect of the water vapor addition. Energy & Fuels. 2012;26:3110-4. Epub Apr. 24, 2012.
Barelli et al., Hydrogen production through sorption-enhanced steam methane reforming and membrane technology: A review. Energy. 2008;33:554-70.
Bhatia et al, Effect of the product layer on the kinetics of the $CO_2$-lime reaction. AIChE J. Jan. 1983;29(1):79-86.
Bolis, Fundamentals in adsorption at the solid-gas interface. Concepts and Thermodynamics. Chapter 1. Calorim Therm Methods Catal. 2013;154:3-50.
Boot-Handford et al., Carbon capture and storage update. Energy Environmental Sci. 2014;7: 130-89.
Choi et al., Adsorbent materials for carbon dioxide capture from large anthropogenic point sources. ChemSusChem. 2009;2(9):796-854. doi: 10.1002/cssc.200900036.
Cormos, Integrated assessment of IGCC power generation technology with carbon capture and storage (CCS). Energy. 2012; 42:434-445. Epub Apr. 11, 2012.
D'Alessandro et al., Carbon dioxide capture: prospects for new materials. Angew Chem Int Ed Engl. Aug. 16, 2010;49(35):6058-82. doi: 10.1002/anie.201000431.
Damm et al., Conceptual study of distributed $CO_2$ capture and the sustainable carbon economy. Energy Convers Manag. 2008;49:1674-83. Epub Jan. 8, 2008.
Ding et al., Adsorption-enhanced steam-methane reforming. Chem Eng Sci. 2000;55:3929-40.
Fuss et al., Betting on negative emissions. Nat Clim Change. Oct. 2014;4:850-3.
Harada et al., Alkali metal nitrate-promoted high-capacity MgO adsorbents for regenerable $CO_2$ capture at moderate temperatures. Chem Mater. 2015;27:1943-9. Epub Mar. 3, 2015.
Harada et al., Colloidal nanoclusters of MgO coated with alkali metal nitrates/nitrites for rapid, high capacity $Co_2$ capture at moderate temperature. Chem Mater. 2015;27:8153-61. Epub Nov. 9, 2015.
Harada et al., Tri-lithium borate (Li3BO3); a new highly regenerable high capacity $CO_2$ adsorbent at intermediate temperature. J Mater Chem A. 2017;5:22224-33. Epub Oct. 7, 2017.
Harrison, Sorption-enhanced hydrogen production: A review. Ind Eng Chem Res. 2008;47(17):6486-501. Epub Jul. 31, 2008.
Haszeldine, Carbon capture and storage: How green can black be? Science. Sep. 25, 2009;325(5948):1647-52. doi: 10.1126/science. 1172246.
Huang et al., Alkali carbonate molten salt-coated calcium oxide with highly improved carbon dioxide capture capacity. Energy Technol. Aug. 2017;5(8):1328-36. doi: 10.1002/ente.21600628.
Huang et al., Numerical simulation of diffusion-controlled solid-state reactions in spherical particles. Mater Sci and Engineering: B. Feb. 2004;107(1):39-45.
Jakubov et al., Temperature dependence of adsorption. J Coll Interf Sci. Jan. 1981;79(1):170-7.
Kato et al., Carbon dioxide absorption by lithium orthosilicate in a wide range of temperature and carbon dioxide concentrations. J Mater Sci Lett. 2002: 21:485-7.
Khawam et al., Solid-state kinetic models: basics and mathematical fundamentals. J Phys Chem B. Sep. 7, 2006;110(35):17315-28. Epub Aug. 15, 2006.
Kim et al., High-temperature $CO_2$ sorption on hydrotalcite having a high Mg/Al molar ratio. ACS Appl Mater Interfaces. Mar. 9, 2016;8(9):5763-7. doi: 10.1021/acsami.5b12598. Epub Feb. 29, 2016.
Liu et al., Performance enhancement of calcium oxide sorbents for cyclic $CO_2$ capture—A review. Energy Fuels. 2012;26(5):2751-67. Epub Apr. 13, 2012.
Martelli et al., Comparison of coal IGCC with and without $CO_2$ capture and storage: Shell gasification with standard vs. partial water quench. Energy Procedia. 2009;1:607-14.
Matsukura et al., Synthesis and $CO_2$ absorption properties of single-phase $Li_2CuO_2$ as a $CO_2$ absorbent. Chem Lett. 2010;39:966-7. Epub Aug. 5, 2010.
Mosqueda et al., Chemical sorption of carbon dioxide ($CO_2$) on lithium oxide ($Li_2O$). Chem Mater. 2006;18(9):2307-10. Epub Apr. 5, 2006.
Nakagawa et al., A novel method of $CO_2$ capture from high temperature gases. J Electrochem Soc. Apr. 1998;145(4):1344-6.
Palacios-Romero et al., Lithium cuprate ($Li_2CuO_2$): A new possible ceramic material for $CO_2$chemisorption. Chem Lett. 2008;37(8):862-3. Epub Jul. 12, 2008.
Qiao et al., Alkali nitrates molten salt modified commercial MgO for intermediate-temperature $CO_2$ capture: Optimization of the Li/Na/K ratio. Ind Eng Chem Res. 2017; 56:1509-17. Epub Jan. 23, 2017.
Qin et al., Impact of organic interlayer anions on the $CO_2$ adsorption performance of Mg—Al layered double hydroxides derived mixed oxides. J Energy Chem. May 2017;26(3):346-53. Epub Jan. 12, 2017.
Scholes et al., $CO_2$ capture from pre-combustion processes—Strategies for membrane gas separation. Int J Greenh Gas Control. 2010;4:739-755. Epub May 26, 2010.
Su et al., Postsynthetic functionalization of Mg-Mof-74 with tetraethylenepentamine: Structural characterization and enhanced $CO_2$ adsorption. ACS Appl Mater Interfaces. Mar. 29, 2017;9(12):11299-11306. doi: 10.1021/acsami.7b02471. Epub Feb. 28, 2017.
Wang et al., Synthesis of a highly efficient $Li_4SiO_4$ ceramic modified with a gluconic acid-based carbon coating for high-temperature $CO_2$ capture. Appl Energy. 2016;183:1418-27. Epub Oct. 3, 2016.
Wang et al., Synthesis of high-temperature $CO_2$ adsorbents from organo-layered double hydroxides with markedly improved $CO_2$ capture capacity. Energy Environ Sci. 2012;5:7526-30. Epub Apr. 17, 2012 .

(56) References Cited

OTHER PUBLICATIONS

Wang et al., Recent advances in solid sorbents for $CO_2$ capture and new development trends. Energy Environ Sci. 2014;7:3478-518.

Xiao et al., A citrate sol-gel method to synthesize $Li_2ZrO_3$ nanocrystals with improved $CO_2$ capture properties. J Mater Chem. 2011;21:3838-42. Epub Jan. 27, 2011.

Yang et al., Preparation of novel $Li_4SiO_4$ sorbents with superior performance at low $CO_2$ concentration. ChemSusChem. Jul. 7, 2016;9(13):1607-13. doi: 10.1002/cssc.201501699. Epub Jun. 17, 2016.

Zhang et al., Phase transfer-catalyzed fast $CO_2$ absorption by MgO-based absorbents with high cycling capacity. Adv Mater Interfaces 2014;1:1400030(1-6).

* cited by examiner

CARBON DIOXIDE REMOVAL USING LITHIUM BORATE

RELATED APPLICATIONS

This application claims priority to U.S. Provisional Application No. 62/517,791, filed Jun. 9, 2017, and entitled "Carbon Dioxide Removal Using Lithium Borate," which is incorporated herein by reference in its entirety for all purposes.

TECHNICAL FIELD

Carbon dioxide removal using lithium borate is generally described.

BACKGROUND

There is a long-term need to suppress $CO_2$ emissions (e.g., from the burning of fossil fuels) to avoid dangerous anthropogenic interference with the climate system. In 2014, around 2.2 billion tons of $CO_2$ were generated from coal-fired electric power plants in the United States (representing 40% of the emissions in the U.S.). About 25% of the $CO_2$ emissions from fossil fuels in the United States are from mobile sources (e.g., automobiles, trucks, trains, and ships).

There is, therefore, a desire to stem release of $CO_2$ by developing carbon capture technologies, including post-combustion carbon capture technologies. Accordingly, improved materials, systems, and methods for capturing $CO_2$ would be desirable.

SUMMARY

Capture of carbon dioxide ($CO_2$) using sequestration materials comprising lithium borate, and related materials, systems, and methods, are generally described. Certain embodiments are related to sequestration materials comprising lithium borate, which sequestration materials also optionally comprise a salt comprising nitrite and/or nitrate. According to certain embodiments, the sequestration material is in the form of a particulate material. Methods of capturing carbon dioxide using sequestration materials are also described. According to certain embodiments, the sequestration materials can capture a relatively large amount of carbon dioxide per mass of the sequestration material. In some embodiments, the sequestration material can be cycled repeatedly while losing little if any ability to sequester carbon dioxide.

The subject matter of the present invention involves, in some cases, interrelated products, alternative solutions to a particular problem, and/or a plurality of different uses of one or more systems and/or articles.

In one aspect, inventive sequestration materials are described.

In some embodiments, the sequestration material comprises a plurality of particles comprising lithium borate, wherein each particle of the plurality of particles has a maximum cross-sectional dimension; each particle of the plurality of particles has a particle volume; the plurality of particles has a total particle volume defined by the total of each of the individual particle volumes; and at least about 50% of the total particle volume is made up of particles having maximum cross-sectional dimensions of less than 100 microns.

According to certain embodiments, the sequestration material comprises lithium borate, and a salt comprising nitrate and/or nitrite in combination with the lithium borate.

In certain embodiments, the sequestration material comprises lithium borate, wherein the sequestration material is capable of interacting with carbon dioxide such that at least 1.0 mmol of carbon dioxide is sequestered per gram of the sequestration material.

In some embodiments, the sequestration material is a porous sequestration material, and the sequestration material comprises lithium borate. In some such embodiments, the lithium borate is in the form of $Li_3BO_3$.

In some embodiments, the sequestration material comprises $Li_3BO_3$, $KNO_2$, and $NaNO_2$.

In another aspect, inventive methods are provided.

In some embodiments, the method comprises exposing a sequestration material comprising lithium borate and a salt comprising nitrate and/or nitrite to an atmosphere containing carbon dioxide in an amount of at least 1 mol % such that carbon dioxide interacts with the sequestration material and is sequestered from the atmosphere.

The method comprises, according to certain embodiments, exposing a sequestration material comprising a plurality of particles comprising lithium borate to an atmosphere containing carbon dioxide in an amount of at least 1 mol % such that carbon dioxide interacts with the sequestration material and is sequestered from the atmosphere, wherein: each particle of the plurality of particles has a maximum cross-sectional dimension; each particle of the plurality of particles has a particle volume; the plurality of particles has a total particle volume defined by the total of each of the individual particle volumes; and at least about 50% of the total particle volume is made up of particles having maximum cross-sectional dimensions of less than 100 microns.

The method comprises, according to some embodiments, exposing a sequestration material comprising lithium borate to an atmosphere containing carbon dioxide in an amount of at least 1 mol % such that at least 1.0 mmol of carbon dioxide is sequestered from the atmosphere per gram of the sequestration material.

In certain embodiments, the method comprises exposing a sequestration material comprising $Li_3BO_3$ to an atmosphere containing carbon dioxide in an amount of at least 1 mol % such that the sequestration material sequesters carbon dioxide from the atmosphere.

In some embodiments, the method comprises exposing a sequestration material comprising lithium borate and a salt comprising nitrate and/or nitrite to a stream containing carbon dioxide such that carbon dioxide interacts with the sequestration material and is sequestered from the stream.

According to certain embodiments, the method comprises exposing a sequestration material comprising a plurality of particles comprising lithium borate to a stream containing carbon dioxide such that carbon dioxide interacts with the sequestration material and is sequestered from the stream, wherein: each particle of the plurality of particles has a maximum cross-sectional dimension; each particle of the plurality of particles has a particle volume; the plurality of particles has a total particle volume defined by the total of each of the individual particle volumes; and at least about 50% of the total particle volume is made up of particles having maximum cross-sectional dimensions of less than 100 microns.

According to some embodiments, the method comprises exposing a sequestration material comprising lithium borate to a stream containing carbon dioxide such that at least 1.0 mmol of carbon dioxide is sequestered from the stream per gram of the sequestration material.

The method comprises, according to some embodiments, exposing a sequestration material comprising $Li_3BO_3$ to a stream containing carbon dioxide such that the sequestration material sequesters carbon dioxide from the stream.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
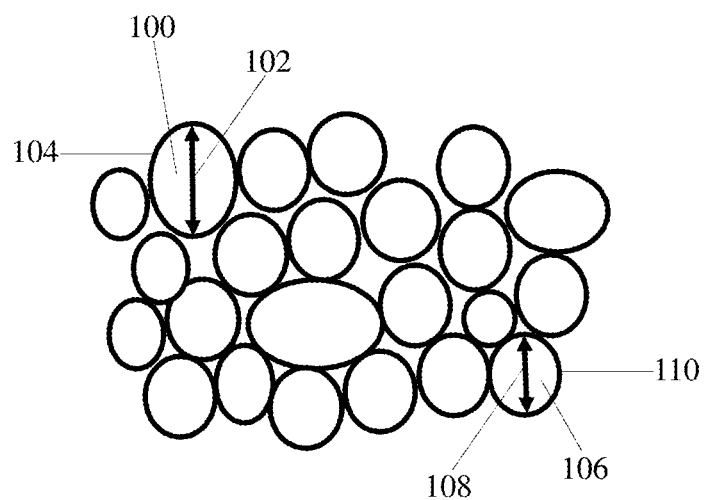
FIG. 1 is a schematic illustration showing a plurality of particles of sequestration material, according to certain embodiments.

Capture of carbon dioxide ($CO_2$) using sequestration materials comprising lithium borate, and related materials, systems, and methods, are generally described. Certain embodiments of the sequestration materials described herein are high capacity, highly regenerable sequestration materials effective at intermediate to high temperatures (e.g., from 450 to 700° C.).

Certain embodiments are related to sequestration materials comprising lithium borate, optionally in the form of $Li_3BO_3$. According to certain embodiments, the sequestration material, optionally, further comprises a salt comprising nitrate and/or nitrite in combination with the lithium borate material.

According to certain embodiments, the sequestration material is in the form of a particulate material. The particulate sequestration material can be made primarily of particles having relatively small maximum cross-sectional dimensions (e.g., less than 100 microns), according to certain embodiments.

In addition to sequestration materials, methods of capturing carbon dioxide using sequestration materials are also described. For example, certain of the sequestration materials described herein can be used to remove carbon dioxide from a chemical process stream (e.g., the exhaust stream of a combustion system) and/or from an atmosphere containing carbon dioxide (e.g., an atmosphere within a reactor or other unit operation).

As noted above, certain of the sequestration materials described herein are high capacity sequestration materials. That is to say, according to certain embodiments, the sequestration materials can capture a relatively large amount of carbon dioxide per mass of the sequestration material. The ability to capture a large amount of carbon dioxide per mass of the sequestration material can be advantageous as it can allow one to capture a relatively large amount of carbon dioxide using a sequestration unit having a relatively small volume and/or mass.

Also as noted above, certain of the sequestration materials are highly regenerable. That is to say, according to certain embodiments, the sequestration material can be cycled repeatedly while losing little if any ability to sequester carbon dioxide. The ability to repeatedly cycle the sequestration material while maintaining the ability of the sequestration material to sequester carbon dioxide can drastically reduce the amount of waste (e.g., poisoned or otherwise ineffective sequestration material) produced by the sequestration system.

Certain embodiments are related to a sequestration material. As used herein, the phrase "sequestration material" is used to describe a material that is capable of removing carbon dioxide from a carbon-dioxide-containing environment.

In certain embodiments, the removal of the carbon dioxide from the environment by the sequestration material comprises adsorption of the carbon dioxide onto the sequestration material. In some embodiments, the removal of the carbon dioxide from the environment by the sequestration material comprises chemical reaction of the carbon dioxide with the sequestration material. According to certain embodiments, the removal of the carbon dioxide from the environment by the sequestration material comprises diffusion of the carbon dioxide into the sequestration material. Combinations of two or more of these mechanisms (i.e., adsorption, chemical reaction, and/or diffusion) are also possible. As would be understood by those of ordinary skill in the art, chemical reaction, in this context, involves a chemical process in which at least one covalent bond is newly formed and/or in which at least one covalent bond is broken, resulting in a reaction product that is compositionally distinguishable from the starting reactants. In certain embodiments, both carbon dioxide and at least one chemical within the sequestration material participate in the chemical reaction that occurs during sequestration.

According to certain embodiments, the sequestration material comprises lithium borate. As used herein, the term "lithium borate" refers to chemical species of the form $Li_xB_yO_z$, where x, y, and z are positive and non-zero.

A number of types of lithium borate materials can be used in the sequestration materials described herein. Non-limiting examples of suitable lithium borates (which can be used alone, or in combination) include, but are not limited to, $LiBO_2$, $Li_3B_5O_5$, $Li_2B_4O_7$, $Li_3BO_3$, $Li_3B_7O_{12}$, $Li_3B_{11}O_{18}$, $Li_4B_2O_5$, and $Li_6B_4O_9$. According to certain embodiments, the sequestration material comprises $Li_3BO_3$. In some embodiments, it can be advantageous to employ $Li_3BO_3$ as a lithium borate in the sequestration material. Without wishing to be bound by any particular theory, it is believed that $Li_3BO_3$ may react with carbon dioxide in a favorable manner, and the use of $Li_3BO_3$ can enhance the ability of the sequestration material to sequester carbon dioxide.

In some embodiments, a relatively large percentage of the sequestration material is made up of one or more lithium borates and a salt comprising nitrite and/or nitrate (if said salt is present). For example, in some embodiments, at least 25 wt %, at least 35 wt %, at least 50 wt %, at least 65 wt %, at least 75 wt %, at least 90 wt %, at least 95 wt %, at least 98 wt %, at least 99 wt %, at least 99.9 wt %, or more of the sequestration material is made up of one or more lithium borates and any salt comprising nitrite and/or nitrate that is present in the sequestration material. In some embodiments, at least 25 mol %, at least 35 mol %, at least 50 mol %, at least 65 mol %, at least 75 mol %, at least 90 mol %, at least 95 mol %, at least 98 mol %, at least 99 mol %, at least 99.9 mol %, or more of the sequestration material is made up of one or more lithium borates and any salt comprising nitrite and/or nitrate that is present in the sequestration material.

In some embodiments, a relatively large percentage of the sequestration material is made up of one or more lithium borates. For example, in some embodiments, at least 25 wt %, at least 35 wt %, at least 50 wt %, at least 65 wt %, at least 75 wt %, at least 90 wt %, at least 95 wt %, at least 98 wt %, at least 99 wt %, at least 99.9 wt %, or more of the sequestration material is made up of one or more lithium borates. In some embodiments, at least 25 mol %, at least 35 mol %, at least 50 mol %, at least 65 mol %, at least 75 mol %, at least 90 mol %, at least 95 mol %, at least 98 mol %, at least 99 mol %, at least 99.9 mol %, or more of the sequestration material is made up of one or more lithium borates.

In some embodiments, a relatively large percentage of the sequestration material is made up of $Li_3BO_3$. For example, in some embodiments, at least 25 wt %, at least 35 wt %, at least 50 wt %, at least 65 wt %, at least 75 wt %, at least 90 wt %, at least 95 wt %, at least 98 wt %, at least 99 wt %, at least 99.9 wt %, or more of the sequestration material is made up of $Li_3BO_3$. In certain embodiments, at least 25 mol %, at least 35 mol %, at least 50 mol %, at least 65 mol %, at least 75 mol %, at least 90 mol %, at least 95 mol %, at least 98 mol %, at least 99 mol %, at least 99.9 mol %, or more of the sequestration material is made up of $Li_3BO_3$.

In some embodiments, the sequestration material comprises a salt comprising nitrite and/or nitrate. The term "nitrite" is given its ordinary meaning in the art, as is used to refer to mono-anionic $NO_2$ (i.e., $NO_2^-$). The term "nitrate" is also given its ordinary meaning in the art, as is used to refer to mono-anionic $NO_3$ (i.e., $NO_3^-$).

According to certain embodiments, the salt contains only nitrite and no nitrate. In other embodiments, the salt contains only nitrate and no nitrite. In other embodiments, the salt contains both nitrite and nitrate.

The salt comprising the nitrite and/or nitrate can have a number of chemical compositions.

In some embodiments, the salt comprising the nitrite and/or the nitrate is a salt of an alkali metal and/or a salt of an alkaline earth metal. According to certain embodiments, the sequestration material comprises at least one salt comprising a nitrite and/or a nitrate of an alkali metal. According to certain embodiments, the sequestration material comprises at least one salt comprising a nitrite of an alkali metal.

The term "alkali metal" is used herein to refer to the following six chemical elements of Group 1 of the periodic table: lithium (Li), sodium (Na), potassium (K), rubidium (Rb), cesium (Cs), and francium (Fr).

The term "alkaline earth metal" is used herein to refer to the six chemical elements in Group 2 of the periodic table: beryllium (Be), magnesium (Mg), calcium (Ca), strontium (Sr), barium (Ba), and radium (Ra).

According to certain embodiments, the salt comprising the nitrite and/or the nitrate is a nitrite and/or a nitrate of Na, K, Li, Rb, and/or Cs. In certain embodiments, the salt comprising the nitrite and/or the nitrate is a nitrite and/or a nitrate of Na, K, and/or Li. In certain embodiments, the salt comprising the nitrite and/or the nitrate is a nitrite and/or nitrate of Na and/or K. In some embodiments, it can be advantageous for the salt to comprise $KNO_2$ and/or $NaNO_2$. In certain embodiments, the salt comprises $KNO_2$. In some embodiments, the salt comprises $NaNO_2$. In certain embodiments, the salt comprises both $KNO_2$ and $NaNO_2$. For example, in some embodiments, the salt comprises a binary mixture of $NaNO_2$ and $KNO_2$. According to some embodiments, the salt comprises a eutectic ratio of nitrites. For example, in certain embodiments, the salt comprises a eutectic 1:1 equimolar mixture of $NaNO_2$ and $KNO_2$.

According to some embodiments, the sequestration material contains the salt comprising the nitrite and/or nitrate in specific amounts. In some embodiments, at least 1 wt %, at least 2 wt %, at least 5 wt %, or at least 10 wt % of the sequestration material is made up of the salt comprising the nitrite and/or the nitrate. According to certain embodiments, less than or equal to 30 wt %, less than or equal to 25 wt %, less than or equal to 20 wt %, or less than or equal to 15 wt % of the sequestration material is made up of the salt comprising the nitrite and/or the nitrate. In certain embodiments, 10 wt % of the sequestration material is made up of the salt comprising nitrite and/or nitrate. Combinations of these ranges are also possible (e.g., at least 1 wt % and less than or equal to 30 wt %). In some embodiments, at least 1 mol %, at least 2 mol %, at least 5 mol %, or at least 10 mol % of the sequestration material is made up of the salt comprising the nitrite and/or the nitrate. According to certain embodiments, less than or equal to 30 mol %, less than or equal to 25 mol %, less than or equal to 20 mol %, or less than or equal to 15 mol % of the sequestration material is made up of the salt comprising the nitrite and/or the nitrate. In certain embodiments, 10 mol % of the sequestration material is made up of the salt comprising nitrite and/or nitrate. Combinations of these ranges are also possible (e.g., at least 1 mol % and less than or equal to 30 mol %).

In some embodiments, at least 1 wt %, at least 2 wt %, at least 5 wt %, or at least 10 wt % of the sequestration material is made up of the salt comprising a nitrite. According to certain embodiments, less than or equal to 30 wt %, less than or equal to 25 wt %, less than or equal to 20 wt %, or less than or equal to 15 wt % of the sequestration material is made up of the salt comprising a nitrite. Combinations of these ranges are also possible (e.g., at least 1 wt % and less than or equal to 30 wt %). In some embodiments, at least 1 mol %, at least 2 mol %, at least 5 mol %, or at least 10 mol % of the sequestration material is made up of the salt comprising a nitrite. According to certain embodiments, less than or equal to 30 mol %, less than or equal to 25 mol %, less than or equal to 20 mol %, or less than or equal to 15 mol % of the sequestration material is made up of the salt comprising a nitrite. Combinations of these ranges are also possible (e.g., at least 1 mol % and less than or equal to 30 mol %).

In some embodiments, at least 1 wt %, at least 2 wt %, at least 5 wt %, or at least 10 wt % of the sequestration material is made up of the salt comprising the total amount of $KNO_2$ and $NaNO_2$. According to certain embodiments, less than or equal to 30 wt %, less than or equal to 25 wt %, less than or equal to 20 wt %, or less than or equal to 15 wt % of the sequestration material is made up of the salt comprising the total amount of $KNO_2$ and $NaNO_2$. Combinations of these ranges are also possible (e.g., at least 1 wt % and less than or equal to 30 wt %). In some embodiments, at least 1 mol %, at least 2 mol %, at least 5 mol %, or at least 10 mol % of the sequestration material is made up of the salt comprising the total amount of $KNO_2$ and $NaNO_2$. According to certain embodiments, less than or equal to 30 mol %, less than or equal to 25 mol %, less than or equal to 20 mol %, or less than or equal to 15 mol % of the sequestration material is made up of the salt comprising the total amount of $KNO_2$ and $NaNO_2$. Combinations of these ranges are also possible (e.g., at least 1 mol % and less than or equal to 30 mol %).

In some embodiments, at least 1 wt %, at least 2 wt %, at least 5 wt %, or at least 10 wt % of the sequestration material is made up of the salt comprising the total amount of $KNO_2$. According to certain embodiments, less than or equal to 30 wt %, less than or equal to 25 wt %, less than or equal to 20 wt %, or less than or equal to 15 wt % of the sequestration material is made up of the salt comprising the total amount of $KNO_2$. Combinations of these ranges are also possible (e.g., at least 1 wt % and less than or equal to 30 wt %). In some embodiments, at least 1 mol %, at least 2 mol %, at least 5 mol %, or at least 10 mol % of the sequestration material is made up of the salt comprising the total amount of $KNO_2$. According to certain embodiments, less than or equal to 30 mol %, less than or equal to 25 mol %, less than or equal to 20 mol %, or less than or equal to 15 mol % of the sequestration material is made up of the salt comprising the total amount of $KNO_2$. Combinations of these ranges are also possible (e.g., at least 1 mol % and less than or equal to 30 mol %).

In accordance with certain embodiments, the salt comprising the nitrite and/or nitrate can have a variety of suitable forms. For example, according to certain embodiments, the salt comprising the nitrite and/or nitrate is in solid form. That is to say, the ions that make up the salt comprising the nitrite and/or nitrate are ionically bonded to each other to form a solid material. In certain embodiments, the salt comprising the nitrite and/or nitrate is in molten form. For example, a solid salt comprising the nitrite and/or nitrate can be heated above its melting temperature which results in the solid itself transitioning into a liquid state. According to certain embodiments, the salt comprising the nitrite and/or nitrate is a salt having a melting point below 600° C. when at atmospheric pressure. Those of ordinary skill in the art would understand that a molten salt is different from a solubilized salt (i.e., a salt that has been dissolved within a solvent).

According to some embodiments, the sequestration material comprises a lithium borate and a salt comprising nitrate and/or nitrate in combination with the lithium borate. The salt comprising the nitrite and/or nitrate and the lithium borate can be combined in any of a variety of suitable ways. According to certain embodiments, the salt comprising the nitrite and/or nitrate and the lithium borate can be mixed together, for example, in a homogeneous or a heterogeneous mixture. In some embodiments, the salt comprising the nitrite and/or nitrate can be coated over the lithium borate. For example, according to certain embodiments, a coating of the salt comprising the nitrite and/or nitrate can be present on lithium borate particles such that a core-shell structure is formed. According to some embodiments in which the lithium borate and the nitrite and/or nitrate salt form a core-shell structure, the shell is continuous. In other embodiments, in which the lithium borate and the nitrite and/or nitrate salt form a core-shell structure, the shell is discontinuous (e.g., covering at least 25%, at least 50%, at least 75%, at least 90%, or at least 99% of the core and/or less than or equal to 99%, less than or equal to 95%, less than or equal to 90%, less than or equal to 75%, or less than or equal to 50% of the core). In some embodiments, the shell of the core-shell structure is substantially conformal. For example, in some embodiments, the thickness of the shell of the core-shell structure does not deviate by more than 20% relative to the average thickness of the shell over at least 75% of the area of the shell.

According to certain embodiments, the salt comprising the nitrite and/or nitrate can be in direct contact with the lithium borate. In some embodiments, the salt comprising the nitrite and/or nitrate can be in indirect contact with the lithium borate (i.e., one or more intermediate solid materials can be present between the salt and the lithium borate).

In certain embodiments, the salt comprising nitrite and/or nitrate may be thermally decomposed to generate alkali metal oxide and/or alkaline earth metal oxide in molten form. In some embodiments, such oxides may be present in a mixture (e.g., homogeneous or heterogeneous) with the lithium borate and/or as coating on the lithium borate (e.g., in a core-shell arrangement). In some embodiments, such oxides may be in direct or indirect contact with the lithium borate.

In some embodiments, the total number of moles of nitrate and nitrite in the salt and the total number of moles of lithium borate may be present in the sequestration material in certain proportions. For example, in some embodiments, the total number of moles of nitrate and nitrite in the sequestration material is from 5% to 25% of the number of moles of lithium borate in the sequestration material. In some embodiments, the number of moles of nitrate in the sequestration material is from 5% to 25% of the number of moles of lithium borate in the sequestration material. In some embodiments, the number of moles of nitrite in the sequestration material is from 5% to 25% of the number of moles of lithium borate in the sequestration material.

In some embodiments, the sequestration material may have a relatively high specific surface area, as determined by BET. For example, in some embodiments, the sequestration material (e.g., in particulate form, or otherwise) can have a specific surface area of at least 10 $m^2/g$, at least 20 $m^2/g$, at least 25 $m^2/g$, or at least 30 $m^2/g$. In some embodiments, the sequestration material (e.g., in particulate form, or otherwise) can have a specific surface area of up to 35 $m^2/g$, up to 40 $m^2/g$, up to 50 $m^2/g$, or more. Combinations of these ranges are also possible (e.g., at least 10 $m^2/g$ and up to 50 $m^2/g$).

According to certain embodiments, the sequestration material comprises a plurality of particles. That is to say, the sequestration material can be particulate, according to certain embodiments. The plurality of particles of the particulate sequestration material can be in a number of forms. In some embodiments, the particles of the sequestration material can be separate particles that are not joined to each other. For example, according to certain embodiments, the particles of sequestration material can form a bed of particulate material, for example in a packed column and/or a fluidized bed column. In some embodiments, the particles of the sequestration material can form an assembly of particles. An "assembly" of particles, as used herein, refers to an arrangement in which a plurality of particles are connected to each other such that the particles form a larger article (i.e., the assembly). In some embodiments, the particles within the assembly can be directly connected to each other. For example, the sequestration material particles can be sintered to each other, according to certain embodiments, to form a sintered aggregate. In some embodiments, the sequestration material particles can have one or more functional groups on their surfaces, resulting in aggregation of the particles (e.g., via hydrogen bonding, van der Waals forces, and/or covalent bonding). In some embodiments, the particles within the assembly can be indirectly connected to each other (i.e., such that one or more intermediate materials are present between the particles). For example, in some embodiments, a binder can be present between the particles. Those of ordinary skill in the art would be capable of determining dimensional properties of particles by visual inspection, optionally aided with suitable magnification equipment.

According to certain embodiments in which the sequestration material comprises particles, each particle of the plurality of particles has a maximum cross-sectional dimension. As used herein, the "maximum cross-sectional dimension" of an article (e.g., a particle) refers to the largest distance between two opposed boundaries of the article (e.g., particle) that can be measured. For example, referring to FIG. 1, particle 100 has maximum cross-sectional dimension 102, which is the largest distance between two points on boundary 104 of particle 100. Also shown in FIG. 1, particle 106 has a maximum cross-sectional dimension 108, which is the largest distance between two points on the boundary 110 of particle 106, and the maximum cross sectional dimension of particle 106 is different from the maximum cross sectional dimension of particle 100.

In accordance with certain embodiments, each particle of the plurality of particles has a particle volume; and the plurality of particles has a total particle volume defined by the total of each of the individual particle volumes. For example, referring to FIG. 1, particle 100, particle 106, and all of the other particles each have a volume. The total particle volume is calculated by adding together the volumes of each of the particles.

According to some embodiments, at least 50% of the total particle volume is made up of particles having maximum cross-sectional dimensions of less than 100 microns. For example, referring to FIG. 1, each of particle 100, particle 106, and all of the other particles in FIG. 1 can have a cross-sectional dimension of less than 100 microns. In such cases, 100% of the total particle volume would be made up of particles having maximum cross-sectional dimensions of less than 100 microns. In certain embodiments, at least 50%, at least 60%, at least 70%, at least 80%, at least 90%, at least 95%, at least 99%, or at least 99.9% of the total particle volume is made up of particles having maximum cross-sectional dimensions of less than 100 microns, less than 50 microns, or less than 10 microns. In some embodiments, at least 50%, at least 60%, at least 70%, at least 80%, at least 90%, at least 95%, at least 99%, or at least 99.9% of the total particle volume is made up of particles having maximum cross-sectional dimensions of at least 10 nm, at least 100 nm, at least 1 micron, at least 2 microns, or at least 5 microns. Combinations of these ranges are also possible.

The sequestration materials described herein do not necessarily need to be in particulate form. For example, in some embodiments, the sequestration material can be in the form of a monolith (e.g., a slab). In one set of embodiments, the sequestration material is in the form of a porous monolith, such as a honeycomb monolith. Other form factors are also possible.

In some embodiments, the sequestration material also comprises a hydroxide of an alkali metal. For example, in some embodiments, the sequestration material comprises LiOH. According to certain embodiments, the hydroxide of the alkali metal can be formed as a by-product of a reaction between the sequestration material and the carbon dioxide.

According to certain embodiments, the sequestration material is capable of interacting with carbon dioxide such that a relatively large amount of carbon dioxide is sequestered. As noted above, the interaction between the sequestration material and the carbon dioxide can involve a chemical reaction, adsorption, and/or diffusion. Exemplary mechanisms by which interaction between the sequestration material and the carbon dioxide can proceed are also described in more detail below.

For example, in certain embodiments, the sequestration material is capable of interacting with carbon dioxide such that at least 1.0 mmol of carbon dioxide is sequestered (e.g., from an atmosphere, from a stream) per gram of the sequestration material. In some embodiments, the sequestration material is capable of interacting with carbon dioxide such that at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, or at least 11.0 mmol of carbon dioxide is sequestered (e.g., from an atmosphere, from a stream) per gram of the sequestration material. In certain embodiments, the sequestration material is capable of interacting with carbon dioxide such that up to 12.0 mmol, up to 15.0 mmol, up to 18.0 mmol, up to 18.8 mmol, or more of carbon dioxide is sequestered (e.g., from an atmosphere, from a stream) per gram of the sequestration material. Combinations of these ranges are also possible (e.g., at least 1.0 mmol per gram and up to 18.8 mmol per gram).

According to certain embodiments, the sequestration material is capable of interacting with carbon dioxide such that a relatively large amount of carbon dioxide is sequestered even when the carbon dioxide concentration in the environment (e.g., in an atmosphere, in a stream) is relatively low. For example, in some embodiments, the sequestration material is capable of sequestering at least 1.0 mmol, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, at least 11.0 mmol and/or up to 12.0 mmol, up to 15.0 mmol, up to 18.0 mmol, up to 18.8 mmol, or more of carbon dioxide per gram of the sequestration material when the sequestration material is exposed to a steady state environment containing as little as 50 mol %, as little as 25 mol %, as little as 10 mol %, or as little as 1 mol % carbon dioxide (with the balance of the environment being argon).

According to certain embodiments, the sequestration material is capable of interacting with carbon dioxide such that a relatively large amount of carbon dioxide is sequestered even at relatively low temperatures. For example, in some embodiments, the sequestration material is capable of sequestering at least 1.0 mmol, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, at least 11.0 mmol and/or up to 12.0 mmol, up to 15.0 mmol, up to 18.0 mmol, up to 18.8 mmol, or more of carbon dioxide per gram of the sequestration material when the sequestration material is at a temperature of 700° C. or less, at a temperature of 650° C. or less, at a temperature of 600° C. or less, at a temperature of 550° C. or less, or at a temperature of 520° C. or less (and/or, at a temperature of as little as 500° C., as little as 450° C., or as little as 400° C.).

According to certain embodiments, the sequestration material is capable of interacting with carbon dioxide such that a relatively large amount of carbon dioxide is sequestered over a relatively short period of time. For example, in some embodiments, the sequestration material is capable of sequestering at least 1.0 mmol, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, at least 11.0 mmol and/or up to 12.0 mmol, up to 15.0 mmol, up to 18.0 mmol, up to 18.8 mmol, or more of carbon dioxide per gram of the sequestration material when the sequestration material is exposed to an environment containing the carbon dioxide for a period of 24 hours or less, 12 hours or less, 8 hours or less, 4 hours or less, or 1 hour or less (and/or, as little as 30 minutes, or as little as 10 minutes).

Combinations of the above-mentioned performance capabilities are also possible. For example, in some embodiments, the sequestration material is capable of sequestering at least 1.0 mmol (or at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, at least 11.0 mmol and/or up to 12.0 mmol, up to 15.0 mmol, up to 18.0 mmol, up to 18.8 mmol, or more) of carbon dioxide per gram of the sequestration material when the sequestration material is at a temperature of 700° C. or less (or at a temperature of 650° C. or less, at a temperature of 600° C. or less, at a temperature of 550° C. or less, at a temperature of 520° C. or less and/or at a temperature of as little as 500° C., as little as 450° C., or as little as 400° C.) when the sequestration material is exposed to a steady state environment containing as little as 50 mol % (or as little as 25 mol %, as little as 10 mol %, or as little as 1 mol %) carbon dioxide (with the balance of the environment being argon) for a period of 24 hours or less (or 12 hours or less, 8 hours or less, 4 hours or less, 1 hour or less and/or as little as 30 minutes, or as little as 10 minutes).

The amount of carbon dioxide sequestered by a sequestration material can be determined, for example, using thermogravimetric analysis.

The sequestration material may be capable, according to certain embodiments, of performing a series of sequestration/regeneration cycles. Generally, a sequestration/regeneration cycle is made up of a sequestration step (in which $CO_2$ is sequestered by the sequestration material) followed by a regeneration step (in which $CO_2$ is released by the sequestration material). According to certain embodiments, the sequestration material is capable of being subjected to a relatively large number of sequestration/regeneration cycles while maintaining the ability to sequester and release relatively large amounts of $CO_2$.

For example, according to certain embodiments, the sequestration material is capable of being subject to at least 2 (or at least 5, at least 10, at least 50, at least 100, at least 1000, or at least 10,000) complete sequestration/regeneration cycles. In some such embodiments, during each of the 2 (or during each of the 5, each of the 10, each of the 50, each of the 100, each of the 1000, and/or each of the 10,000) complete sequestration steps of the cycles, the amount of $CO_2$ that is sequestered by the sequestration material is at least 75%, at least 90%, at least 95%, at least 98%, at least 99%, or at least 99.9% of the amount of $CO_2$ that is sequestered by the sequestration material during the complete sequestration step of the $1^{st}$ cycle. In some such embodiments, during each of the 2 (or during each of the 5, each of the 10, each of the 50, each of the 100, each of the 1000, and/or each of the 10,000) complete regeneration steps of the cycles, the amount of $CO_2$ that is released by the sequestration material is at least 75%, at least 90%, at least 95%, at least 98%, at least 99%, or at least 99.9% of the amount of $CO_2$ that is released by the sequestration material during the complete regeneration step of the $1^{st}$ cycle. In some such embodiments, the amount of $CO_2$ that is released by the sequestration material during the complete regeneration step of the $1^{st}$ cycle is at least 75%, at least 90%, at least 95%, at least 98%, at least 99%, or at least 99.9% of the amount of $CO_2$ that is sequestered by the sequestration material during the complete sequestration step of the $1^{st}$ cycle. In some such embodiments, the amount of $CO_2$ that is sequestered during the complete sequestration step of the $1^{st}$ cycle is at least 1.0 mmol, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, or at least 11.0 mmol (and/or up to 12.0 mmol, up to 15.0 mmol, up to 18.0 mmol, up to 18.8 mmol, or more) per gram of the sequestration material. In certain embodiments, the temperature of the sequestration material during the complete sequestration/regeneration cycles is less than or equal to 700° C., less than or equal to 650° C., less than or equal to 600° C., less than or equal to 550° C., or less than or equal to 520° C. (and/or, greater than or equal to 500° C., greater than or equal to 450° C., or greater than or equal to 400° C.). In certain embodiments, the time over which each of the complete sequestration steps and each of the complete regeneration steps occurs is 24 hours or less (or 12 hours or less, 8 hours or less, 4 hours or less, 1 hour or less and/or as little as 30 minutes, or as little as 10 minutes). In some embodiments, the steady state concentration of carbon dioxide in the environment to which the sequestration material is exposed during the complete sequestration/regeneration cycles is as little as 50 mol %, as little as 25 mol %, as little as 10 mol %, or as little as 1 mol % carbon dioxide (with the balance of the environment being argon).

According to certain embodiments, the sequestration material is capable of being subjected to at least 2 (or at least 5, at least 10, at least 50, at least 100, at least 1000, or at least 10,000) complete sequestration/regeneration cycles. In some such embodiments, during each of the 2 (or during each of the 5, each of the 10, each of the 50, each of the 100, each of the 1000, and/or each of the 10,000) complete sequestration steps of the cycles, the amount of $CO_2$ that is sequestered by the sequestration material is at least 1.0 mmol, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, or at least 11.0 mmol (and/or up to 12.0 mmol, up to 15.0 mmol, up to 18.0 mmol, up to 18.8 mmol, or more) per gram of the sequestration material. In some such embodiments, during each of the 2 (or during each of the 5, each of the 10, each of the 50, each of the 100, each of the 1000, and/or each of the 10,000) complete regeneration steps of the cycles, the amount of $CO_2$ that is released by the sequestration material is at least 1.0 mmol, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, or at least 11.0 mmol (and/or up to 12.0 mmol, up to 15.0 mmol, up to 18.0 mmol, up to 18.8 mmol, or more) per gram of the sequestration material. In certain embodiments, the temperature of the sequestration material during the complete sequestration/regeneration cycles is less than or equal to 700° C., less than or equal to 650° C., less than or equal to 600° C., less than or equal to 550° C., or less than or equal to 520° C. (and/or, greater than or equal to 500° C., greater than or equal to 450° C., or greater than or equal to 400° C.). In certain embodiments, the time over which each of the complete sequestration steps and each of the complete regeneration steps occurs is 24 hours or less (or 12 hours or less, 8 hours or less, 4 hours or less, 1 hour or less and/or as little as 30 minutes, or as little as 10 minutes). In some embodiments, the steady state concentration of carbon dioxide in the environment to which the sequestration material is exposed during the complete sequestration/regeneration cycles is as little as 50 mol %, as little as 25 mol %, as little as 10 mol %, or as little as 1 mol % carbon dioxide (with the balance of the environment being argon).

A "complete sequestration/regeneration cycle" is a sequestration/regeneration cycle that includes a complete sequestration step followed by a complete regeneration step. A "complete sequestration" step constitutes exposing the sequestration material to a $CO_2$ containing atmosphere until the sequestration material becomes saturated with $CO_2$ (i.e., the sequestration material is no longer able to take up $CO_2$). A "complete regeneration" step constitutes exposing the sequestration material to an environment until $CO_2$ is no longer released from the sequestration material.

According to certain embodiments, the sequestration material is capable of being subjected to at least 2 (or at least 5, at least 10, at least 50, at least 100, at least 1000, or at least 10,000) sequestration/regeneration cycles in which each of the sequestration steps and/or each of the regeneration steps lasts no more than 24 hours each (or, no more than 12 hours each, no more than 6 hours each, no more than 3 hours each, no more than 2 hours each, or no more than 1 hour each). In some such embodiments, during each of the 2 (or during each of the 5, each of the 10, each of the 50, each of the 100, each of the 1000, and/or each of the 10,000) sequestration steps of the sequestration/regeneration cycles, the amount of $CO_2$ that is sequestered by the sequestration material is at least 75%, at least 90%, at least 95%, at least 98%, at least 99%, or at least 99.9% of the amount of $CO_2$ that is sequestered by the sequestration material during sequestration step of the $1^{st}$ cycle. In some such embodiments, during each of the 2 (or during each of the 5, each of the 10, each of the 50, each of the 100, each of the 1000, and/or each of the 10,000) regeneration steps of the sequestration/regeneration cycles, the amount of $CO_2$ that is released by the sequestration material is at least 75%, at least 90%, at least 95%, at least 98%, at least 99%, or at least 99.9% of the amount of $CO_2$ that is released by the sequestration material during the regeneration step of the $1^{st}$ cycle. In some such embodiments, the amount of $CO_2$ that is released by the sequestration material during the regeneration step of the $1^{st}$ cycle is at least 75%, at least 90%, at least 95%, at least 98%, at least 99%, or at least 99.9% of the amount of $CO_2$ that is sequestered by the sequestration material during the sequestration step of the $1^{st}$ cycle. In some such embodiments, the amount of $CO_2$ that is sequestered during the sequestration step of the $1^{st}$ cycle is at least 1.0 mmol, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, or at least 11.0 mmol (and/or up to 12.0 mmol, up to 15.0 mmol, up to 18.0 mmol, up to 18.8 mmol, or more) per gram of the sequestration material. In some such embodiments, the temperature of the sequestration material during each of the sequestration/regeneration cycles is less than or equal to 700° C., less than or equal to 650° C., less than or equal to 600° C., less than or equal to 550° C., or less than or equal to 520° C. (and/or, greater than or equal to 500° C., greater than or equal to 450° C., or greater than or equal to 400° C.). In some such embodiments, the steady state concentration of carbon dioxide in the environment to which the sequestration material is exposed during each of the sequestration/regeneration cycles is as little as 50 mol %, as little as 25 mol %, as little as 10 mol %, or as little as 1 mol % carbon dioxide (with the balance of the environment being argon).

According to certain embodiments, the sequestration material is capable of being subjected to at least 2 (or at least 5, at least 10, at least 50, at least 100, at least 1000, or at least 10,000) sequestration/regeneration cycles in which each of the sequestration steps and/or each of the regeneration steps lasts no more than 24 hours each (or, no more than 12 hours each, no more than 6 hours each, no more than 3 hours each, no more than 2 hours each, or no more than 1 hour each). In some such embodiments, during each of the 2 (or during each of the 5, each of the 10, each of the 50, each of the 100, each of the 1000, and/or each of the 10,000) sequestration steps of the cycles, the amount of $CO_2$ that is sequestered by the sequestration material is at least 1.0 mmol, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, or at least 11.0 mmol (and/or up to 12.0 mmol, up to 15.0 mmol, up to 18.0 mmol, up to 18.8 mmol, or more) per gram of the sequestration material. In some such embodiments, during each of the 2 (or during each of the 5, each of the 10, each of the 50, each of the 100, each of the 1000, and or each of the 10,000)

regeneration steps of the cycles, the amount of $CO_2$ that is released by the sequestration material is at least 1.0 mmol, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, or at least 11.0 mmol (and/or up to 12.0 mmol, up to 15.0 mmol, up to 18.0 mmol, up to 18.8 mmol, or more) per gram of the sequestration material. In some such embodiments, the temperature of the sequestration material during each of the sequestration/regeneration cycles is less than or equal to 700° C., less than or equal to 650° C., less than or equal to 600° C., less than or equal to 550° C., or less than or equal to 520° C. (and/or, greater than or equal to 500° C., greater than or equal to 450° C., or greater than or equal to 400° C.). In some such embodiments, the steady state concentration of carbon dioxide in the environment to which the sequestration material is exposed during each of the sequestration/regeneration cycles is as little as 50 mol %, as little as 25 mol %, as little as 10 mol %, or as little as 1 mol % carbon dioxide (with the balance of the environment being argon).

Certain embodiments are related to methods of sequestering $CO_2$ using the sequestration material. The sequestration material can be, for example, any of the sequestration materials described above, or elsewhere herein. In one embodiment, as noted above, the sequestration material comprises lithium borate. The lithium borate can be in the form of $Li_xB_yO_z$, according to certain embodiments. In some embodiments, as noted above, the sequestration material can comprise nitrate/nitrite salt. In certain embodiments, as noted above, the sequestration material can be particulate, or can have any of the other form factors outlined above or elsewhere herein.

According to certain embodiments, the method of sequestering carbon dioxide using the sequestration material comprises exposing the sequestration material to carbon dioxide. The sequestration material can be exposed to the carbon dioxide in a number of ways. For example, in some embodiments, the sequestration material can be added to an environment (e.g., an atmosphere, a stream) containing the carbon dioxide. According to certain embodiments, the carbon dioxide can be transported into (e.g., flowed over) the environment surrounding the sequestration material. Combinations of these methods are also possible. The carbon dioxide to which the sequestration material is exposed is generally in fluidic form (e.g., in the form of a gas and/or a supercritical fluid). In certain embodiments, at least a portion of the carbon dioxide to which the sequestration material is exposed is in the form of a subcritical gas.

According to certain embodiments, exposing the sequestration material to carbon dioxide comprises exposing the sequestration material to an atmosphere containing carbon dioxide. The atmosphere to which the sequestration material is exposed can be, for example, contained within a chemical processing unit operation. Non-limiting examples of such unit operations include reactors (e.g., packed bed reactors, fluidized bed reactors), separators (e.g., particulate filters, such as diesel particulate filters), and mixers. According to certain embodiments, the atmosphere is part of and/or derived from the output of a combustion process.

In certain embodiments, exposing the sequestration material to carbon dioxide comprises exposing the sequestration material to a stream containing carbon dioxide. The stream to which the sequestration material is exposed can be, for example, part of and/or derived from a carbon-dioxide-containing stream of a chemical process. For example, in some embodiments, the stream to which the sequestration material is exposed can be part of and/or derived from an output (e.g., an exhaust stream) of a combustion process. In some embodiments, at least a portion of an output stream of a combustion process is directly transported through the sequestration material. The stream to which the sequestration material is exposed can be, for example, transported through a chemical processing unit operation. Non-limiting examples of such unit operations include reactors (e.g., packed bed reactors, fluidized bed reactors), separators (e.g., particulate filters, such as diesel particulate filters), and mixers.

The sequestration materials described herein can be used to remove carbon dioxide generated by a variety of systems. For example, in some embodiments, the sequestration material is used to remove carbon dioxide from an exhaust stream from a boiler (e.g., in a powered plant), from an exhaust stream from an integrated gasification combined cycle (IGCC) power plant, from an exhaust stream from an internal combustion engine (e.g., from motor vehicle), from an exhaust stream from a pyro-processing furnace (e.g., as used in the cement industry), and/or from a stream from a hydrogen generation process (e.g., by sorption enhanced steam reforming (SESR)).

The concentration of the carbon dioxide in the fluid to which the sequestration material is exposed can be within a variety of ranges. In some embodiments, the carbon-dioxide-containing fluid (e.g., an atmosphere, a stream) to which the sequestration material is exposed contains carbon dioxide in an amount of at least 1 mol %. In certain embodiments, the carbon-dioxide-containing fluid (e.g., an atmosphere, a stream) to which the sequestration material is exposed contains carbon dioxide in an amount of at least 5 mol %, at least 10 mol %, at least 20 mol %, at least 30 mol %, at least 40 mol %, at least 50 mol %, at least 75 mol %, at least 90 mol %, at least 95 mol %, at least 99 mol %, or at least 99.9 mol %. The sequestration material can be exposed, in some embodiments, to essentially pure carbon dioxide.

Certain embodiments comprise exposing the sequestration material to carbon dioxide (e.g., an atmosphere, a stream) such that at least a portion of the carbon dioxide interacts with the sequestration material and is sequestered (e.g., from the atmosphere, from the stream). The interaction between the carbon dioxide that is sequestered and the sequestration material can take a variety of forms. For example, in certain embodiments, carbon dioxide is adsorbed onto the sequestration material. In some embodiments, carbon dioxide chemically reacts with the sequestration material. In some embodiments, carbon dioxide diffuses into the sequestration material. Combinations of two or more of these mechanisms (i.e., adsorption, chemical reaction, and/or diffusion) are also possible.

In some embodiments, at least one of the following chemical reactions proceeds during the sequestration of the carbon dioxide by the sequestration material:

$$4Li_3BO_3 + 3CO_2 \leftrightarrow 3Li_2CO_3 + Li_6B_4O_9 \quad [I]$$

$$4Li_3BO_3 + 5CO_2 \leftrightarrow 5Li_2CO_3 + Li_2B_4O_7 \quad [II]$$

$$Li_3BO_3 + CO_2 \leftrightarrow Li_2CO_3 + LiBO_2 \quad [III]$$

$$2Li_3BO_3 + 3CO_2 \leftrightarrow 3Li_2CO_3 + B_2O_3 \quad [IV]$$

In some embodiments, Equation I proceeds during the sequestration of the carbon dioxide by the sequestration material. In some embodiments, Equation II proceeds during the sequestration of the carbon dioxide by the sequestration material. In some embodiments, Equation III proceeds during the sequestration of the carbon dioxide by the sequestration material. In some embodiments, Equation IV proceeds during the sequestration of the carbon dioxide by the sequestration material. In certain embodiments, Equation I, Equation II, and Equation III all proceed during the sequestration of the carbon dioxide by the sequestration material. In certain embodiments, Equation I, Equation II, Equation III, and Equation IV all proceed during the sequestration of the carbon dioxide by the sequestration material.

According to certain embodiments, a relatively large amount of carbon dioxide is sequestered by the sequestration material (e.g., from an atmosphere, from a stream) during the exposure of the sequestration material to the carbon dioxide. For example, in certain embodiments, at least 1.0 mmol of carbon dioxide is sequestered (e.g., from an atmosphere, from a stream) per gram of the sequestration material. In some embodiments, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, or at least 11.0 mmol of carbon dioxide is sequestered (e.g., from an atmosphere, from a stream) per gram of the sequestration material. In certain embodiments, up to 12.0 mmol, up to 15.0 mmol, up to 18.0 mmol, up to 18.8 mmol, or more of carbon dioxide is sequestered (e.g., from an atmosphere, from a stream) per gram of the sequestration material. Combinations of these ranges are also possible (e.g., at least 1.0 mmol per gram and up to 18.8 mmol per gram).

According to certain embodiments, at least a portion of the carbon dioxide interacts with the sequestration material and is sequestered from the gas containing $CO_2$, such as from an atmosphere or a stream as noted above, over the period of at least 10 minutes, at least 30 minutes, at least 1 hour, at least 2 hours, at least 3 hours, or at least 4 hours. In some embodiments, at least a portion of the carbon dioxide interacts with the sequestration material and is sequestered from the gas containing $CO_2$, such as from an atmosphere or a stream as noted above, over the period of up to 5 hours, up to 10 hours, up to 15 hours, up to 20 hours, up to 24 hours, or more. Combinations of these ranges are also possible.

In certain embodiments, at least 1.0 mmol of the carbon dioxide is sequestered (e.g., from the atmosphere, from the stream) per gram of the sequestration material per 24 hours. In some embodiments, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, at least 15.0 mmol, at least 18.0 mmol, at least 18.8 mmol of the carbon dioxide is sequestered from the stream per gram of the sequestration material per 24 hours. According to some embodiments, up to 12.0 mmol, up to 15.0 mmol, up to 18.0 mmol, up to 18.8 mmol, or more of the carbon dioxide is sequestered from the stream per gram of the sequestration material per 24 hours.

In certain embodiments, the temperature of the sequestration material is less than or equal to 700° C. during at least a portion of the sequestration of the carbon dioxide from the atmosphere and/or the stream. In certain embodiments, the temperature of the sequestration material is less than or equal to 650° C., less than or equal to 600° C., less than or equal to 550° C., or less than or equal to 520° C. during at least a portion of the sequestration of the carbon dioxide from the atmosphere and/or the stream. In some embodiments, the temperature of the sequestration material is greater than or equal to 400° C., greater than or equal to 450° C., or greater than or equal to 500° C. during at least a portion of the sequestration of the carbon dioxide from the atmosphere and/or the stream. Combinations of these ranges are also possible.

In some embodiments, the temperature of the carbon dioxide is less than or equal to 700° C. during at least a portion of the sequestration of the carbon dioxide from the atmosphere and/or the stream. In certain embodiments, the temperature of the carbon dioxide is less than or equal to 650° C., less than or equal to 600° C., less than or equal to 550° C., or less than or equal to 520° C. during at least a portion of the sequestration of the carbon dioxide from the atmosphere and/or the stream. In certain embodiments, the temperature of the carbon dioxide is greater than or equal to 400° C., greater than or equal to 450° C., or greater than or equal to 500° C. during at least a portion of the sequestration of the carbon dioxide from the atmosphere and/or the stream. Combinations of these ranges are also possible.

In certain embodiments, exposing the sequestration material to carbon dioxide comprises performing at least one sequestration/regeneration cycles. As noted above, each sequestration/regeneration cycle is made up of a sequestration step (in which $CO_2$ is sequestered by the sequestration material) followed by a regeneration step (in which $CO_2$ is released by the sequestration material). According to certain embodiments, the sequestration material can be subject to a relatively large number of sequestration/regeneration cycles while maintaining the ability to sequester and release relatively large amounts of $CO_2$.

The sequestration material can be exposed to any of the environments (e.g., atmospheres, stream) described above or elsewhere herein during one or more (or all) of the sequestration steps of the sequestration cycles. The regeneration cycles can be performed using a variety of suitable fluids (e.g., atmospheres, streams). In some embodiments, regeneration of the sequestration material can be performed by flowing an inert gas (e.g., argon) over the sequestration material. Other suitable environment components that can be used during the regeneration step include, but are not limited to, a flow of 100 mol % nitrogen at atmospheric pressure (1 bar), or a flow of air at atmospheric pressure.

According to certain embodiments, the sequestration material can be subject to at least 2 (or at least 5, at least 10, at least 50, at least 100, at least 1000, or at least 10,000) complete sequestration/regeneration cycles. In some such embodiments, during each of the 2 (or during each of the 5, each of the 10, each of the 50, each of the 100, each of the 1000, and/or each of the 10,000) complete sequestration steps of the cycles, the amount of $CO_2$ that is sequestered by the sequestration material is at least 75%, at least 90%, at least 95%, at least 98%, at least 99%, or at least 99.9% of the amount of $CO_2$ that is sequestered by the sequestration material during the complete sequestration step of the $1^{st}$ cycle. In some such embodiments, during each of the 2 (or during each of the 5, each of the 10, each of the 50, each of the 100, each of the 1000, and/or each of the 10,000) complete regeneration steps of the cycles, the amount of $CO_2$ that is released by the sequestration material is at least 75%, at least 90%, at least 95%, at least 98%, at least 99%, or at least 99.9% of the amount of $CO_2$ that is released by the sequestration material during the complete regeneration step of the $1^{st}$ cycle. In some such embodiments, the amount of $CO_2$ that is released by the sequestration material during the complete regeneration step of the $1^{st}$ cycle is at least 75%, at least 90%, at least 95%, at least 98%, at least 99%, or at least 99.9% of the amount of $CO_2$ that is sequestered by the sequestration material during the complete sequestration step of the $1^{st}$ cycle. In some such embodiments, the amount of $CO_2$ that is sequestered during the complete sequestration step of the $1^{st}$ cycle is at least 1.0 mmol, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, or at least 11.0 mmol (and/or up to 12.0 mmol, up to 15.0 mmol, up to 18.0 mmol, up to 18.8 mmol, or more) per gram of the sequestration material. In certain embodiments, the temperature of the sequestration material during the complete sequestration/regeneration cycles is less than or equal to 700° C., less than or equal to 650° C., less than or equal to 600° C., less than or equal to 550° C., or less than or equal to 520° C. (and/or, greater than or equal to 500° C., greater than or equal to 450° C., or greater than or equal to 400° C.). In certain embodiments, the time over which each of the complete sequestration steps and each of the complete regeneration steps occurs is 24 hours or less (or 12 hours or less, 8 hours or less, 4 hours or less, 1 hour or less and/or as little as 30 minutes, or as little as 10 minutes). In some embodiments, the steady state concentration of carbon dioxide in the environment to which the sequestration material is exposed during the complete sequestration/regeneration cycles is as little as 50 mol %, as little as 25 mol %, as little as 10 mol %, or as little as 1 mol % carbon dioxide (with the balance of the environment being argon).

According to certain embodiments, the sequestration material can be subject to at least 2 (or at least 5, at least 10, at least 50, at least 100, at least 1000, or at least 10,000) complete sequestration/regeneration cycles. In some such embodiments, during each of the 2 (or during each of the 5, each of the 10, each of the 50, each of the 100, each of the 1000, and/or each of the 10,000) complete sequestration steps of the cycles, the amount of $CO_2$ that is sequestered by the sequestration material is at least 1.0 mmol, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, or at least 11.0 mmol (and/or up to 12.0 mmol, up to 15.0 mmol, up to 18.0 mmol, up to 18.8 mmol, or more) per gram of the sequestration material. In some such embodiments, during each of the 2 (or during each of the 5, each of the 10, each of the 50, each of the 100, each of the 1000, and/or each of the 10,000) complete regeneration steps of the cycles, the amount of $CO_2$ that is released by the sequestration material is at least 1.0 mmol, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, or at least 11.0 mmol (and/or up to 12.0 mmol, up to 15.0 mmol, up to 18.0 mmol, up to 18.8 mmol, or more) per gram of the sequestration material. In certain embodiments, the temperature of the sequestration material during the complete sequestration/regeneration cycles is less than or equal to 700° C., less than or equal to 650° C., less than or equal to 600° C., less than or equal to 550° C., or less than or equal to 520° C. (and/or, greater than or equal to 520° C., or greater than or equal to 500° C., or greater than or equal to 450° C., or greater than or equal to 400° C.). In certain embodiments, the time over which each of the complete sequestration steps and each of the complete regeneration steps occurs is 24 hours or less (or 12 hours or less, 8 hours or less, 4 hours or less, 1 hour or less and/or as little as 30 minutes, or as little as 10 minutes). In some embodiments, the steady state concentration of carbon dioxide in the environment to which the sequestration material is exposed during the complete sequestration/regeneration cycles is as little as 50 mol %, as little as 25 mol %, as little as 10 mol %, or as little as 1 mol % carbon dioxide (with the balance of the environment being argon).

A "complete sequestration/regeneration cycle" is a sequestration/regeneration cycle that includes a complete sequestration step followed by a complete regeneration step. A "complete sequestration" step constitutes exposing the sequestration material to a $CO_2$ containing atmosphere until the sequestration material becomes saturated with $CO_2$ (i.e., the sequestration material is no longer able to take up $CO_2$). A "complete regeneration" step constitutes exposing the sequestration material to an environment until $CO_2$ is no longer released from the sequestration material. In some embodiments, after a complete sequestration/regeneration cycle a lithium borate carbonate of the form $Li_wC_xB_yO_z$ can be generated. In some embodiments, w, x, y, and z are positive and non-zero. In certain embodiments, w and x are 0, and y and z are positive and non-zero. In certain embodiments, the generated product is $B_2O_3$.

According to certain embodiments, the sequestration material can be subject to at least 2 (or at least 5, at least 10, at least 50, at least 100, at least 1000, or at least 10,000) sequestration/regeneration cycles in which each of the sequestration steps and/or each of the regeneration steps lasts no more than 24 hours each (or, no more than 12 hours each, no more than 6 hours each, no more than 3 hours each, no more than 2 hours each, or no more than 1 hour each). In some such embodiments, during each of the 2 (or during each of the 5, each of the 10, each of the 50, each of the 100, each of the 1000, and/or each of the 10,000) sequestration steps of the sequestration/regeneration cycles, the amount of $CO_2$ that is sequestered by the sequestration material is at least 75%, at least 90%, at least 95%, at least 98%, at least 99%, or at least 99.9% of the amount of $CO_2$ that is sequestered by the sequestration material during sequestration step of the $1^{st}$ cycle. In some such embodiments, during each of the 2 (or during each of the 5, each of the 10, each of the 50, each of the 100, each of the 1000, and/or each of the 10,000) regeneration steps of the sequestration/regeneration cycles, the amount of $CO_2$ that is released by the sequestration material is at least 75%, at least 90%, at least 95%, at least 98%, at least 99%, or at least 99.9% of the amount of $CO_2$ that is released by the sequestration material during the regeneration step of the $1^{st}$ cycle. In some such embodiments, the amount of $CO_2$ that is released by the sequestration material during the regeneration step of the $1^{st}$ cycle is at least 75%, at least 90%, at least 95%, at least 98%, at least 99%, or at least 99.9% of the amount of $CO_2$ that is sequestered by the sequestration material during the sequestration step of the $1^{st}$ cycle. In some such embodiments, the amount of $CO_2$ that is sequestered during the sequestration step of the $1^{st}$ cycle is at least 1.0 mmol, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, or at least 11.0 mmol (and/or up to 12.0 mmol, up to 15.0 mmol, up to 18.0 mmol, up to 18.8 mmol, or more) per gram of the sequestration material. In some such embodiments, the temperature of the sequestration material during each of the sequestration/regeneration cycles is less than or equal to 700° C., less than or equal to 650° C., less than or equal to 600° C., less than or equal to 550° C., or less than or equal to 520° C. (and/or, greater than or equal to 500° C., or greater than or equal to 450° C., or greater than or equal to 400° C.). In some such embodiments, the steady state concentration of carbon dioxide in the environment to which the sequestration material is exposed during each of the sequestration/regeneration cycles is as little as 50 mol %, as little as 25 mol %, as little as 10 mol %, or as little as 1 mol % carbon dioxide (with the balance of the environment being argon).

According to certain embodiments, the sequestration material can be subject to at least 2 (or at least 5, at least 10, at least 50, at least 100, at least 1000, or at least 10,000) sequestration/regeneration cycles in which each of the sequestration steps and/or each of the regeneration steps lasts no more than 24 hours each (or, no more than 12 hours each, no more than 6 hours each, no more than 3 hours each, no more than 2 hours each, or no more than 1 hour each). In some such embodiments, during each of the 2 (or during each of the 5, each of the 10, each of the 50, each of the 100, each of the 1000, and/or each of the 10,000) sequestration steps of the cycles, the amount of $CO_2$ that is sequestered by the sequestration material is at least 1.0 mmol, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, or at least 11.0 mmol (and/or up to 12.0 mmol, up to 15.0 mmol, up to 18.0 mmol, up to 18.8 mmol, or more) per gram of the sequestration material. In some such embodiments, during each of the 2 (or during each of the 5, each of the 10, each of the 50, each of the 100, each of the 1000, and/or each of the 10,000) regeneration steps of the cycles, the amount of $CO_2$ that is released by the sequestration material is at least 1.0 mmol, at least 2.0 mmol, at least 3.0 mmol, at least 4.0 mmol, at least 5.0 mmol, at least 6.0 mmol, at least 7.0 mmol, at least 8.0 mmol, at least 9.0 mmol, at least 10.0 mmol, or at least 11.0 mmol (and/or up to 12.0 mmol, up to 15.0 mmol, up to 18.0 mmol, up to 18.8 mmol, or more) per gram of the sequestration material. In some such embodiments, the temperature of the sequestration material during each of the sequestration/regeneration cycles is less than or equal to 700° C., less than or equal to 650° C., less than or equal to 600° C., less than or equal to 550° C., or less than or equal to 520° C. (and/or, greater than or equal to 500° C., or greater than or equal to 450° C., or greater than or equal to 400° C.). In some such embodiments, the steady state concentration of carbon dioxide in the environment to which the sequestration material is exposed during each of the sequestration/regeneration cycles is as little as 50 mol %, as little as 25 mol %, as little as 10 mol %, or as little as 1 mol % carbon dioxide (with the balance of the environment being argon).

This application claims priority to U.S. Provisional Application No. 62/517,791, filed Jun. 9, 2017, and entitled "Carbon Dioxide Removal Using Lithium Borate," which is incorporated herein by reference in its entirety for all purposes.

The following examples are intended to illustrate certain embodiments of the present invention, but do not exemplify the full scope of the invention.

Example

This example describes the synthesis of sequestration materials, including lithium borate materials with and without nitrite salts. This example also describes the use of the sequestration materials for the sequestration of $CO_2$ and the regeneration of the sequestration materials.

Lithium hydroxide (LiOH, 98%), boric acid ($H_3BO_3$, 99.5%), sodium nitrite ($NaNO_2$, 97%), and potassium nitrite ($KNO_2$, 96%) were purchased from Sigma-Aldrich. All chemicals were used as received without further purification. All water utilized was Mill-Q (Millipore) deionized water.

A series of lithium borate compounds were prepared by the calcination of a mixed precipitant of lithium hydroxide and boric acid. In a typical procedure for the case of $Li_3BO_3$, 0.06 mol of lithium hydroxide and 0.02 mol of boric acid were dissolved in 40 ml of distilled water at 50° C. under vigorous stirring. The aqueous solution was heated at 120° C. for several hours under stirring to precipitate out the mixed hydroxides. The dried precipitates were ground with an agate mortar and calcined in the oven at 600° C. in air for 4 hours. After cooling to room temperature, the oxides were reground to obtain the final products. For the synthesis of different compositions of lithium borate materials, the amounts of lithium hydroxide and boric acid dissolved in the water were modified to the desired mixing ratio. For the preparation of lithium borate materials mixed with alkali-metal nitrites, sodium nitrite and/or potassium nitrite was dissolved in the aqueous solution of lithium hydroxide and boric acid in the first step, and co-precipitated with their hydroxide, followed by calcination and grinding under the same conditions as described above.

The phase composition and crystallographic structure of the samples were examined by powder X-ray diffractometry (XRD: PANalytical X'Pert Pro Multipurpose Diffractometer with Cu-kα X-ray (λ=1.541 Å)), in which the peak identification of the XRD spectra was performed by referring to the ICDD PDF-4+2016RDB database. $CO_2$ uptake and removal performance was examined by isothermal weight variations of the samples in a flow of dry $CO_2$ at ambient pressure (1 bar), by a thermogravimetric analyzer (TGA: TA Instruments TGA-Q50). All samples were pre-calcined at 650° C. for 30 minutes under a flow of nitrogen in the TGA sample chamber to remove trace species on the materials such as atmospheric $CO_2$ or water in advance of the uptake measurements.

Figure 2A:
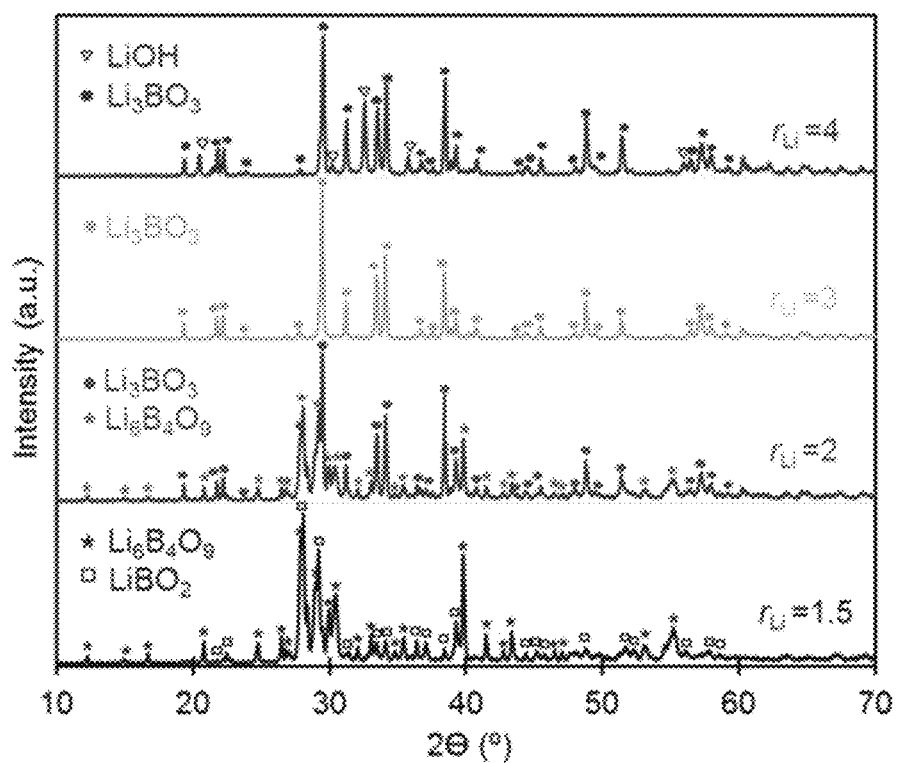
FIG. 2A shows XRD spectra of samples prepared by calcination of mixed precipitants of lithium hydroxide (LiOH) and boric acid ($H_3BO_3$) with different mixing ratios of lithium hydroxide ($r_{Li} = n_{LiOH}/n_{H3BO3}$)
Figure 2B:
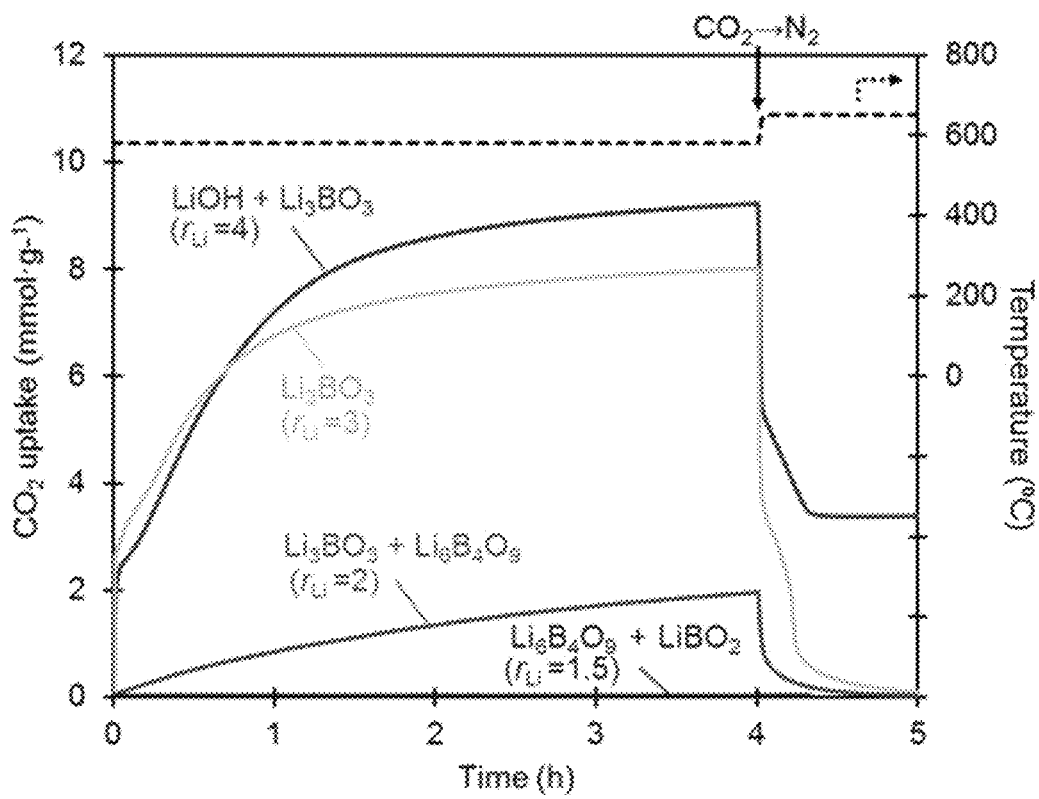
FIG. 2B shows $CO_2$ uptake and the removal performances of sequestration materials with different material phase compositions.

The material phase compositions prepared by the calcination of mixed precipitates of lithium hydroxide (LiOH) and boric acid ($H_3BO_3$) with different mixing ratios ($r_{Li}=n_{LiOH}/n_{H3BO3}$) were identified by XRD spectra, as shown in FIG. 2A. The results revealed that the material composition varied as the mixing ratio of two starting materials changed. At low LiOH mixing ratio ($r_{Li}=1.5$), a mixture of $LiBO_2$ and $Li_6B_4O_9$ resulted. As the mixing ratio increased, a different phase of lithium borate, $Li_3BO_3$, started to appear ($r_{Li}=2$), and a sample composed of a single phase of $Li_3BO_3$ was obtained at =3. When the mixing ratio increased further ($r_{Li}=4$), a LiOH phase with $Li_3BO_3$ was observed. FIG. 2B shows the $CO_2$ uptake and removal performance of these samples. Here, the $CO_2$ uptake was measured at 580° C. under a flow of 100 mol % $CO_2$ at atmospheric pressure (1 bar), and $CO_2$ removal was performed at 650° C. under a flow of 100 mol % $N_2$ at the same pressure. The highest uptake recorded was by the sample composed of a mixture of LiOH and $Li_3BO_3$ synthesized at $r_{Li}=4$. For this case, the uptake of $CO_2$ began with a rapid jump of about 2.0 mmol·g$^{-1}$ within a minute of the start of the $CO_2$ flow, and continued to increase until eventually leveling off at a final uptake capacity exceeding 9.1 mmol·g$^{-1}$ after 4 hours. The $CO_2$ sequestered by the mixture of LiOH and $Li_3BO_3$, however, was not removed completely on calcination at 650° C. under $N_2$ flow. For the single phase $Li_3BO_3$ ($r_{Li}=3$), the $CO_2$ uptake showed a similar behavior with a slightly lower final uptake capacity of 8.04 mmol·g$^{-1}$. In this case, the sequestered $CO_2$ was desorbed completely on calcination at 650° C. for 1 hour. The sample including the mixture of $LiBO_2$ and $Li_3BO_3$ ($r_{Li}=2$) showed no rapid initial jump, and the uptake capacity was much lower than that of the other two samples. The mixture of $LiBO_2$ and $Li_6B_4O_9$ ($r_{Li}$=1.5) exhibited negligible uptake of $CO_2$.

Figure 3A:
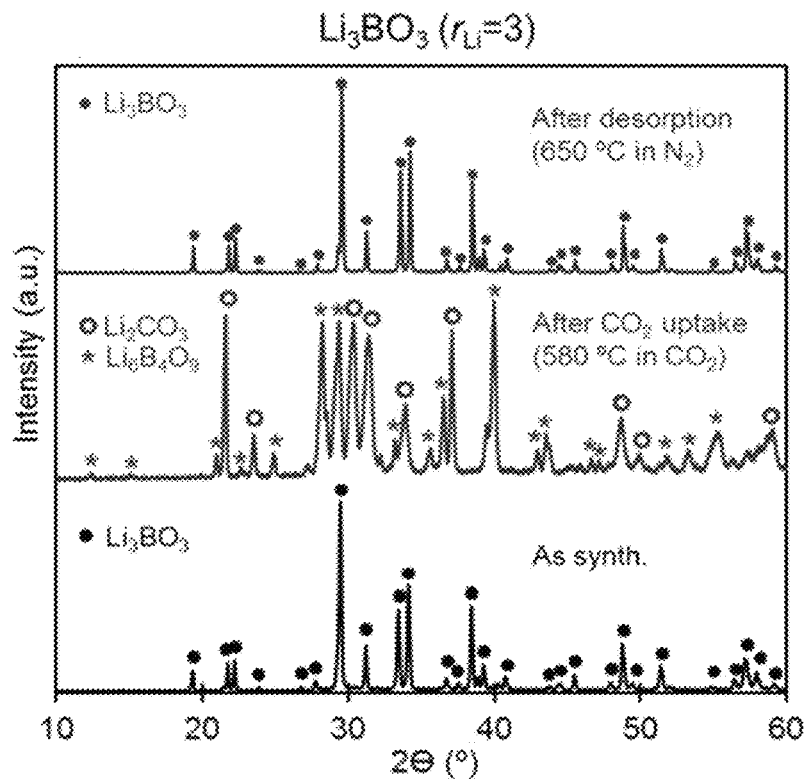
FIG. 3A shows variations of XRD spectra by the uptake of $CO_2$ in a flow of 1 bar of $CO_2$ at 580° C. and removal in a flow of $N_2$ at 650° C. for a single phase of $Li_3BO_3$ ($r_{Li}$=3)
Figure 3B:
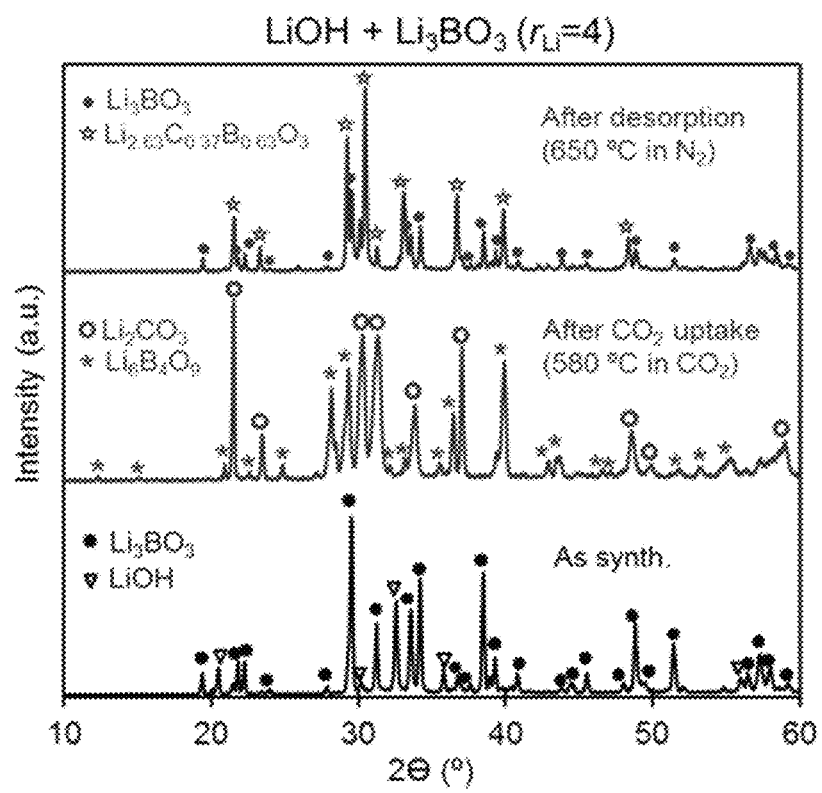
FIG. 3B shows variations of XRD spectra by the uptake of $CO_2$ in a flow of 1 bar of $CO_2$ at 580° C. and removal in a flow of $N_2$ at 650° C. for a mixture of LiOH and $Li_3BO_3$ ($r_{Li}$=4)

To understand the reactions proceeding during the uptake and removal of $CO_2$ in the single phase $Li_3BO_3$ and in the mixture of LiOH and $Li_3BO_3$, the variations in the material composition were also examined by XRD as shown in FIGS. 3A and 3B, respectively. For the case of the single phase $Li_3BO_3$, it is clear that $Li_2CO_3$ and $Li_6B_4O_9$ were generated by the reaction with $CO_2$. Without wishing to be bound by any particular theory, it is believed that this result indicates that the uptake of $CO_2$ by $Li_3BO_3$ proceeded by the following chemical reaction:

$$4Li_3BO_3+3CO_2 \leftrightarrow 3Li_2CO_3+Li_6B_4O_9 \quad (E1)$$

After the removal of $CO_2$, the two reaction products reverted to a single $Li_3BO_3$ phase. For the mixture of LiOH and $Li_3BO_3$, the same products were generated during the reaction with $CO_2$. In this case, the fraction of $Li_2CO_3$ in the product was higher than that in obtained in the single $Li_3BO_3$ phase study. Without wishing to be bound by any particular theory, it is believed that the reaction of LiOH with $CO_2$ could also proceed as:

$$2LiOH+CO_2 \rightarrow Li_2CO_3+H_2O \quad (E2)$$

However, the products generated in this case did not return back to the starting materials on calcination under $N_2$ flow, but rather a non-stoichiometric lithium borate carbonate ($Li_{2.63}C_{0.37}B_{0.63}O_3$) was generated with $Li_3BO_3$. Without wishing to be bound by any particular theory, it is believed that the incomplete removal of $CO_2$ in this case can be explained by the formation of this thermally stable lithium borate carbonate during the removal process.

Figure 4A:
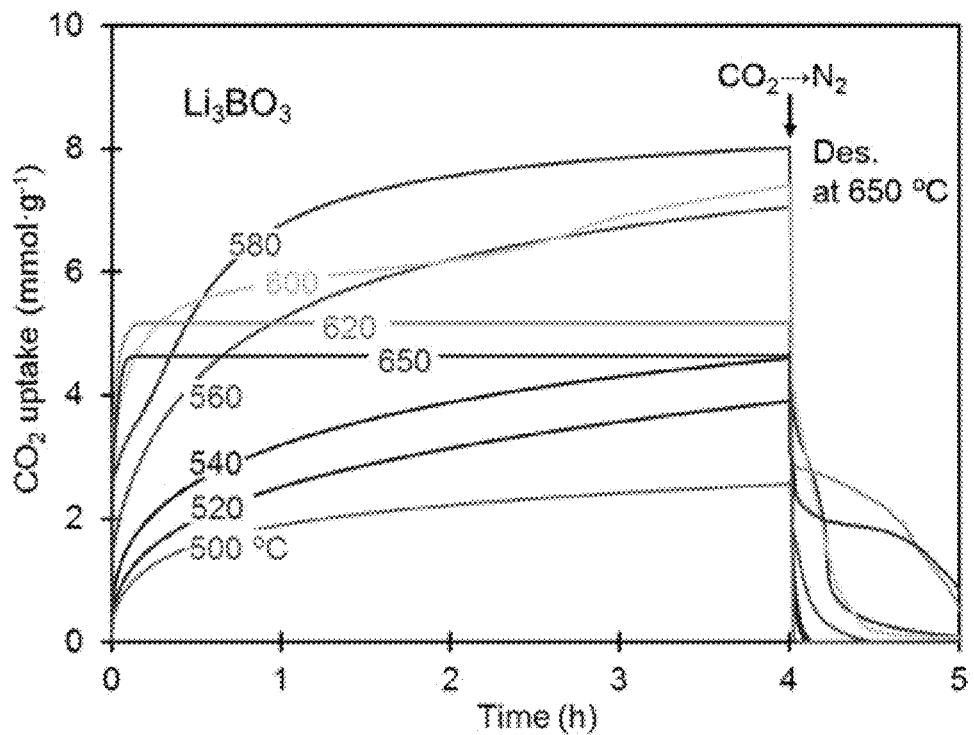
FIG. 4A shows $CO_2$ uptake by a single phase of $Li_3BO_3$=3) in a flow of 1 bar of $CO_2$ at different temperatures and removal at 650° C. in a flow of $N_2$.

FIG. 4A shows the $CO_2$ uptake by the single phase $Li_3BO_3$ at different temperatures. Again, in all cases, $CO_2$ removal following the uptake of $CO_2$ was performed at 650° C. in a flow of $N_2$. The highest uptake was attained at 580° C., where the uptake capacity exceeded 8.04 mmol·g$^{-1}$ at the end of 4 hours of reaction with $CO_2$. As the temperature for the uptake increased, the initial jump in the early stage of the reaction became higher. The uptake rate after the initial jump also increased as the temperature increased. At temperatures higher than 600° C., the uptake began to level off at a lower value, resulting in a lowering of the final uptake capacity. The removal of $CO_2$ proceeded by three-steps, with an initial quick drop leveling off to a plateau over the intermediate regime, followed by a gradual decrease to substantially complete removal. When the temperature for the uptake of $CO_2$ was low, the plateau was small, and the removal of $CO_2$ was substantially completed rapidly in a few minutes. With increasing temperature, the plateau expanded to lengthen the time required for the removal to be substantially completed.

Figure 4B:
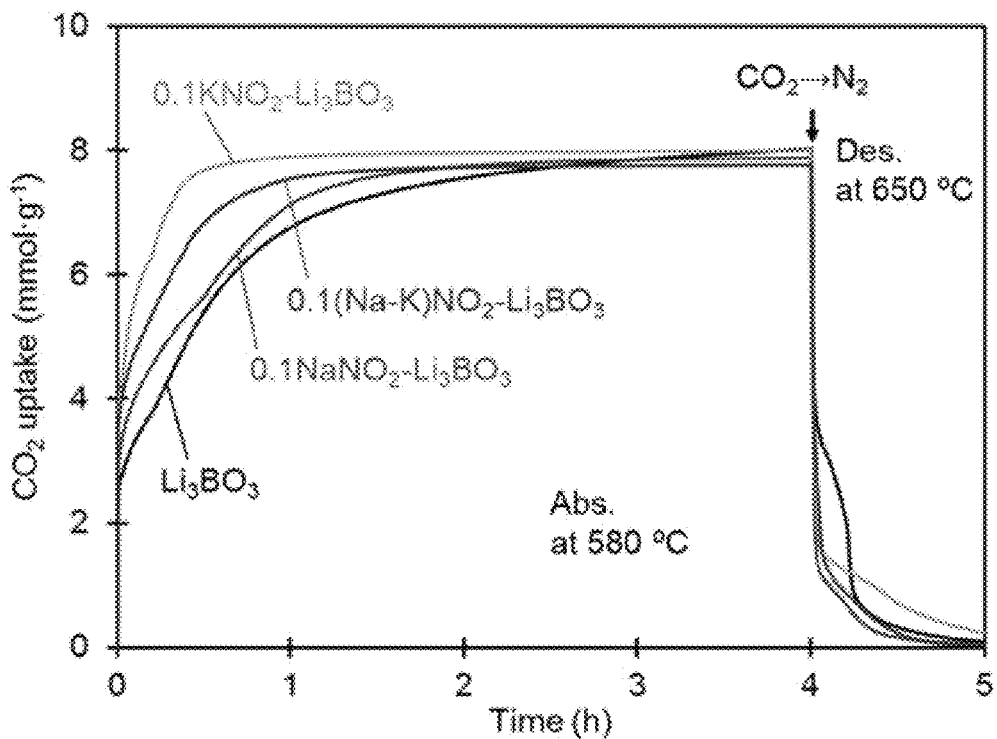
FIG. 4B shows $CO_2$ uptake in a flow of 1 bar of $CO_2$ at 580° C. in a flow of $N_2$ by $Li_3BO_3$ mixed with 10 mol % of alkali-metal nitrite salts of different alkali-metal compositions.

The effects of alkali-metal nitrite salts on the $CO_2$ uptake by $Li_3BO_3$ were also examined FIG. 4B shows the $CO_2$ uptake at 580° C. by $Li_3BO_3$ mixed with 10 mol % of alkali-metal nitrite salts of different alkali-metal compositions, and the subsequent removal of $CO_2$ under $N_2$ flow. The results indicate that the reaction rate for $CO_2$ uptake by $Li_3BO_3$ was improved markedly by mixing of the sequestration material with nitrite salts. Also, the plateau in the removal process diminished in the presence of the nitrite salts. The highest reaction rate for $CO_2$ uptake was achieved by mixing with $KNO_2$, where the uptake exceeded 7.68 mmol·g$^{-1}$ in 30 minutes of the reaction with $CO_2$. However, a longer time for substantially complete removal of $CO_2$ for the $Li_3BO_3$ mixed with $KNO_2$ was observed due to lengthening of the tail in the removal process. When it was mixed with $NaNO_2$, the removal of $CO_2$ completed much more quickly. Both rapid uptake of $CO_2$ and rapid removal were achieved by the mixing of $Li_3BO_3$ with a binary mixture of $NaNO_2$ and $KNO_2$.

Figure 4C:
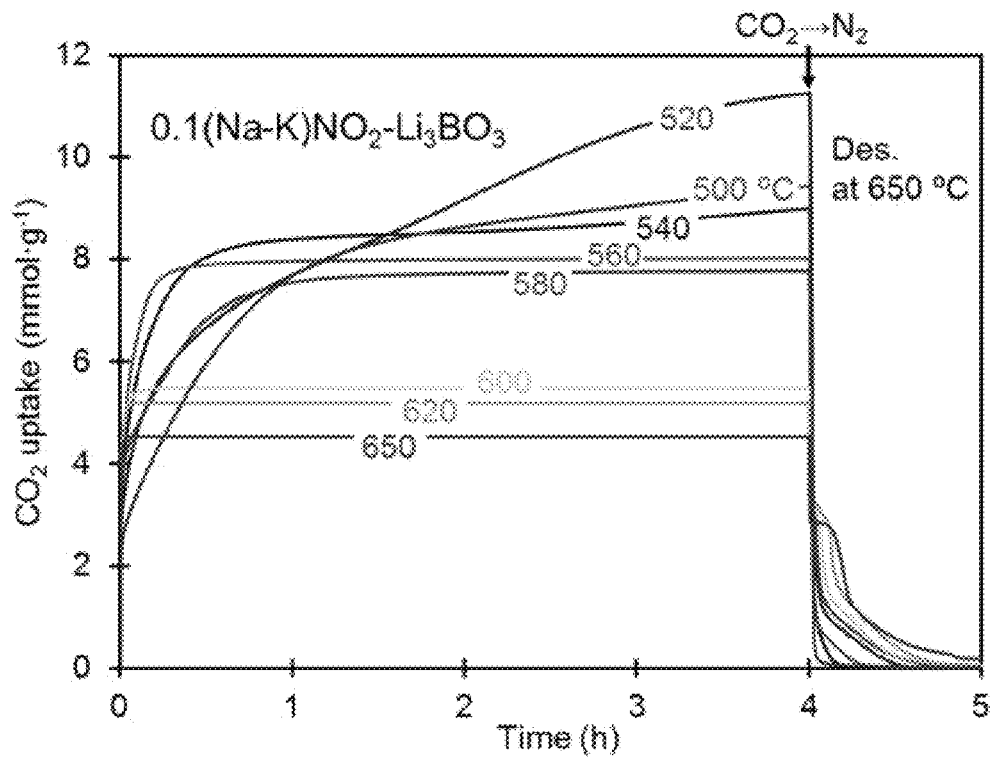
FIG. 4C shows $CO_2$ uptake in a flow of 1 bar of $CO_2$ at different temperatures and removal at 650° C. in a flow of $N_2$ by $Li_3BO_3$ mixed with 10 mol % of (Na—K)$NO_2$.
Figure 4D:
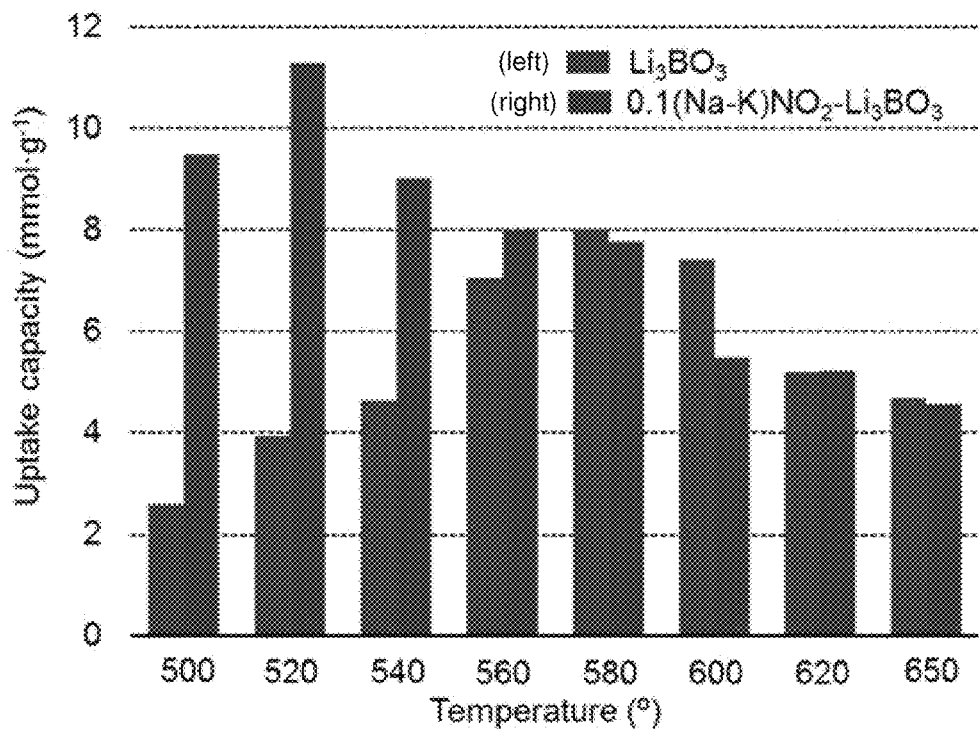
FIG. 4D shows $CO_2$ uptake capacities attained by 4 hours of reaction with $CO_2$ at different temperatures by $Li_3BO_3$ with and without mixing 10 mol % (Na—K)$NO_2$.

$CO_2$ uptake by and removal from $Li_3BO_3$ mixed with 10 mol % of (Na—K)$NO_2$ at different temperatures are shown in FIG. 4C. It is noteworthy that the uptake, in particular at low temperatures, was enhanced significantly by the mixing of the nitrite salts with $Li_3BO_3$. Here, the uptake at 520° C. exceeded 11.3 mmol·g$^{-1}$ after 4 hours of reaction with $CO_2$. The removal of $CO_2$ also proceeded rapidly with a smaller plateau region than in the case of $Li_3BO_3$ without nitrite salts. The $CO_2$ uptake capacities attained after 4 hours of reaction with $CO_2$ are summarized in FIG. 4D. It is clear that the uptake capacities at temperatures lower than 560° C. increased dramatically in the presence of the nitrite salts, while the capacities at temperatures greater than 580° C. were lowered slightly relative to the performance of $Li_3BO_3$ without the nitrite salts.

Figure 5A:
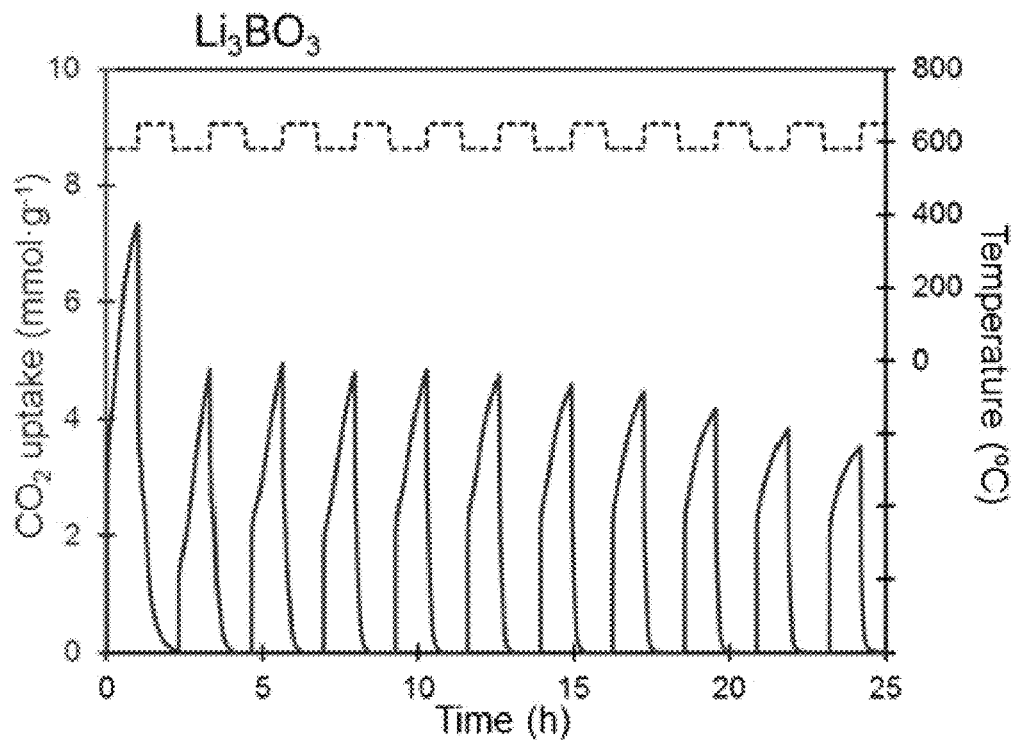
FIG. 5A shows $CO_2$ uptake and removal performance in repeated cycles of reaction with $CO_2$ at 580° C. for 1 hour and calcination at 650° C. in a flow of $N_2$ for 1 hour, for $Li_3BO_3$.
Figure 5B:
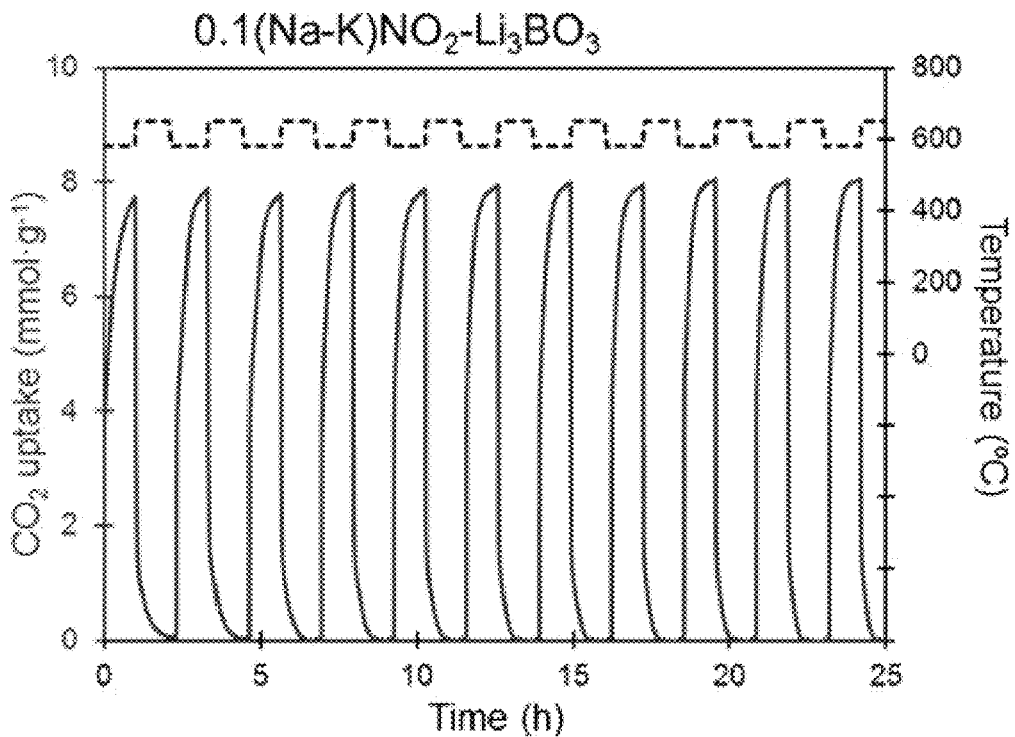
FIG. 5B shows $CO_2$ uptake and the removal performance in the repeated cycles of the reaction with $CO_2$ at 580° C. for 1 hour and the calcination at 650° C. in the flow of $N_2$ for 1 hour, for $Li_3BO_3$ mixed with 10 mol % (Na—K)$NO_2$.

Regenerability under cyclic $CO_2$ uptake and removal operations is generally considered to be an important requirement for $CO_2$ sequestration materials used in practical systems. To examine the cyclic regenerability of $Li_3BO_3$, $CO_2$ uptake and removal by $Li_3BO_3$ and $Li_3BO_3$ mixed with 10 mol % (Na—K)$NO_2$ over repeated cycles was measured. The results are shown in FIGS. 5A and 5B, respectively. For the case of $Li_3BO_3$ without nitrite salts, the uptake decreased in the later cycles. Here, the uptake in the second cycle was 65% of the initial uptake, and then remained at this level for a few cycles before decreasing gradually over subsequent cycles. In contrast, for $Li_3BO_3$ mixed with the nitrite salts, the uptake showed substantially complete regenerability over the multiple cycles examined. The uptake capacity and reaction rate in the later cycles were the same as, or even slightly higher than, the uptake capacity and rate in the first cycle. The $CO_2$ removal performance was also unchanged during the cyclic operation. $CO_2$ sequestered by $Li_3BO_3$ mixed with the nitrite salts was removed substantially completely during the higher number cycles.

Figure 6A:
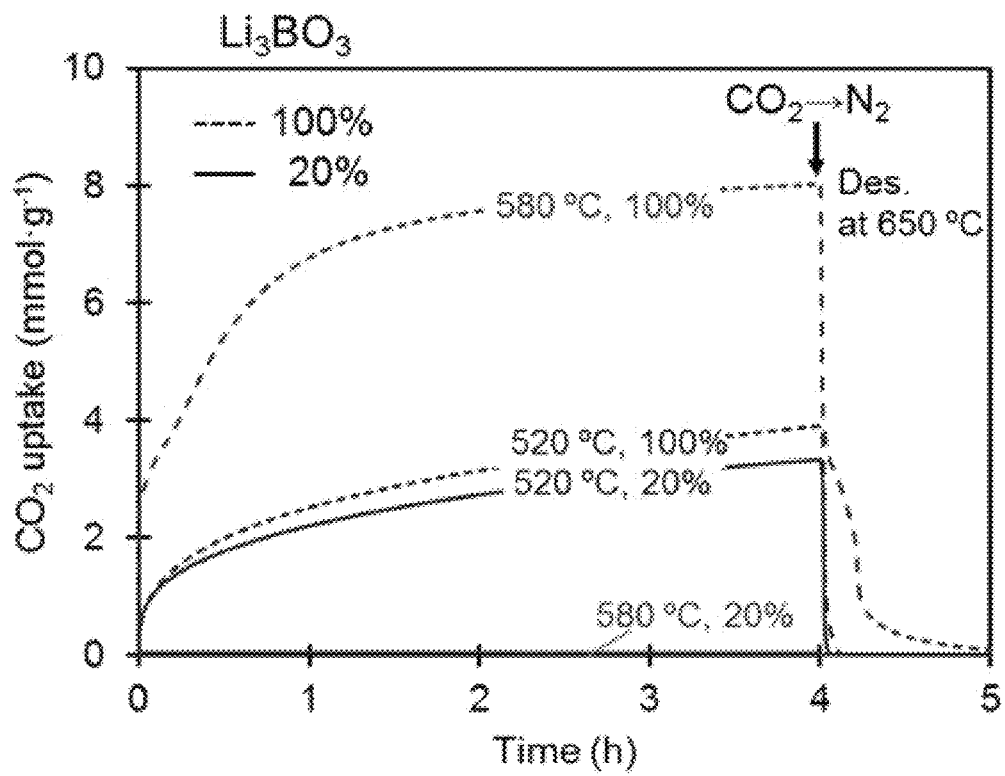
FIG. 6A shows $CO_2$ uptake in flows of different concentrations of $CO_2$ (20% of $CO_2$ balanced with $N_2$ and 100% $CO_2$) at 520° C. and 580° C. and removal in a flow of $N_2$ at 650° C. by $Li_3BO_3$.
Figure 6B:
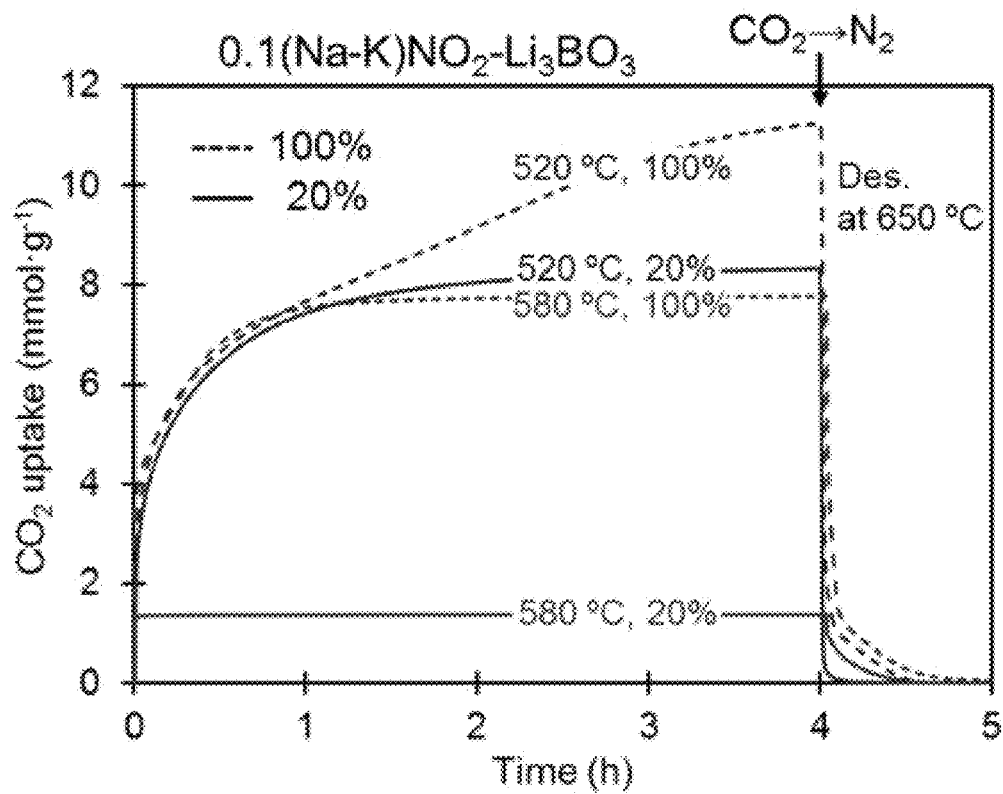
FIG. 6B shows $CO_2$ uptake in flows of different concentrations of $CO_2$ (20% of $CO_2$ balanced with $N_2$ and 100% $CO_2$) at 520° C. and 580° C. and removal in a flow of $N_2$ at 650° C. by $Li_3BO_3$ mixed with 10 mol % (Na—K)$NO_2$.

$CO_2$ uptake from lean gases with low concentrations of $CO_2$ is also generally considered to be important for practical applications of $CO_2$ sequestration materials, especially for post-combustion $CO_2$ capture operations. To examine the influence of $CO_2$ concentration on uptake by the sequestration materials, the sequestration performance of $Li_3BO_3$ and $Li_3BO_3$ mixed with 10 mol % (Na—K)$NO_2$ was evaluated under a flow of 20 mol % $CO_2$ balanced with nitrogen. The results were compared with those obtained with the same samples under 100 mol % $CO_2$ flow in FIGS. 6A and 6B. The $CO_2$ uptake at 580° C. was markedly lower at the lower $CO_2$ concentration than under pure $CO_2$, but at a temperature of 520° C., the effect of $CO_2$ concentration was small. For the case of $Li_3BO_3$ mixed with 10 mol % (Na—K)$NO_2$, the uptake capacity exceeded 8.24 mmol·g$^{-1}$ following 4 hours of reaction with 20 mol % of $CO_2$ at 520° C. Here, the uptake rate in the early stages, i.e., during the first hour, of reaction is almost identical to the rate observed with 100 mol % $CO_2$ in the flowing gas, but at longer exposure times the uptake leveled off under the flow of 20 mol % $CO_2$, while it increased again to a higher final uptake capacity under pure $CO_2$. It should also be noted that the removal of $CO_2$ after uptake from 20 mol % $CO_2$ was completed quickly without the plateau or the long tail in the removal curve observed in the absence of the nitrite salts.

Without wishing to be bound by any particular theory, based on XRD results, the $CO_2$ uptake by $Li_3BO_3$ could be attributed to the dissociative formation of $Li_2CO_3$ and $Li_6B_4O_9$ on reaction with $CO_2$. On the basis of the chemical equation (E1), the theoretical maximum of the uptake capacity is 9.42 mmol·g$^{-1}$. Since the actual uptake by Li$_3$BO$_3$ exceeded 8.04 mmol·g$^{-1}$ at 580° C., the conversion ratio was greater than 85% after 4 hours of reaction with CO$_2$, where the "conversion ratio" is defined as the following:

$$\text{Conversion Ratio}(\%) = \frac{[Li_3BO_3]_{reacted}}{[Li_3BO_3]_{initial}} \times 100\% = \frac{3[CO_2]_{uptake}}{4[Li_3BO_3]_{initial}} \times 100\%.$$

The CO$_2$ uptake by Li$_3$BO$_3$ was initiated by a rapid jump in the first few minutes after the start of the reaction. The initial jump increased with increasing reaction temperature. In general, the sequestration of gaseous molecules on the surface of the solid surface is an exothermic reaction, and the number of molecules sequestered on the solid surface under equilibrium conditions decreases as the temperature increases. Thus, it is believed that the initial jump could be ascribed to a chemical reaction controlled by kinetic limitations. It is believed that the transition from the initial rapid jump to the subsequent slow uptake increase can be explained by a shift from a gas-solid reaction at the particle surface to a solid-state product layer diffusion process as the formation of a surface layer of two reaction products (Li$_2$CO$_3$ and Li$_6$B$_4$O$_9$) proceeded. It is believed that the decrease in the final uptake capacity with temperature increase above 580° C. can be explained by the lowering of the equilibrium conversion ratio as the temperature increased. In the removal process following the uptake of CO$_2$, a plateau appeared in the middle of the CO$_2$ removal profile, and the length of this plateau grew as the temperature for the uptake of CO$_2$ increased. Since the removal of CO$_2$ proceeds by the solid phase inter-diffusion of the two solid products, it is reasonable to assume that the plateau appeared when the diffusion of two solid products started to control the overall reaction. The growth of the plateau region with increasing CO$_2$ uptake temperature suggests that the phase isolation of the two solid products increased as the temperature for CO$_2$ uptake increased.

Figure 7:
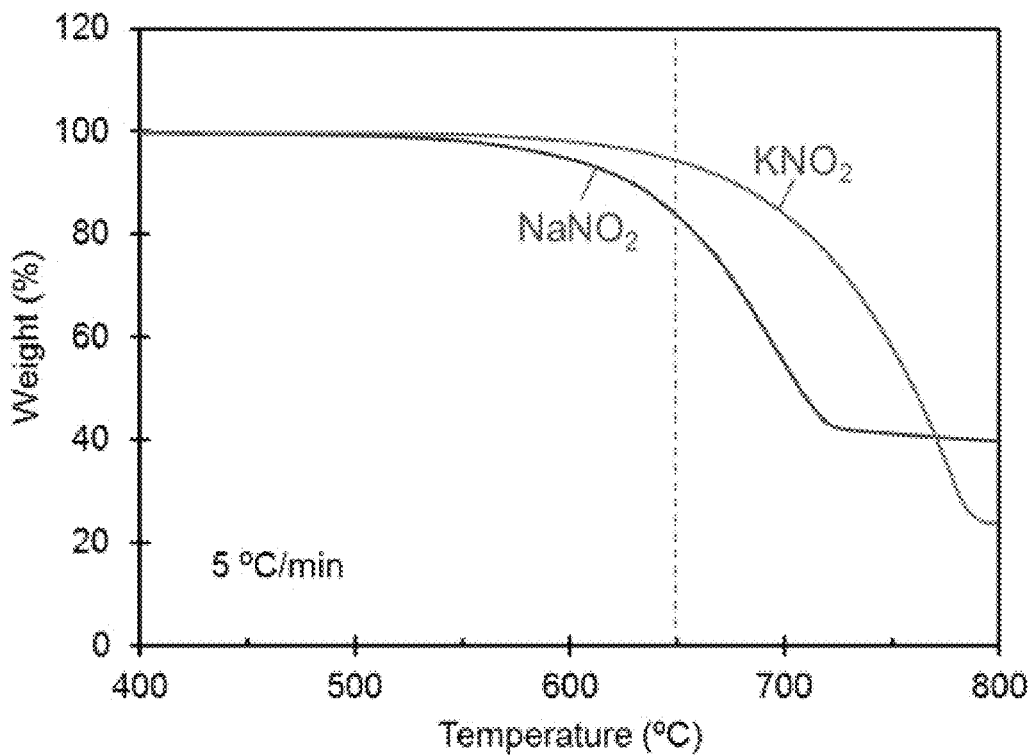
FIG. 7 shows weight variation of $NaNO_2$ and $KNO_2$ as the temperature increases in the flow of $N_2$.
Figure 8:
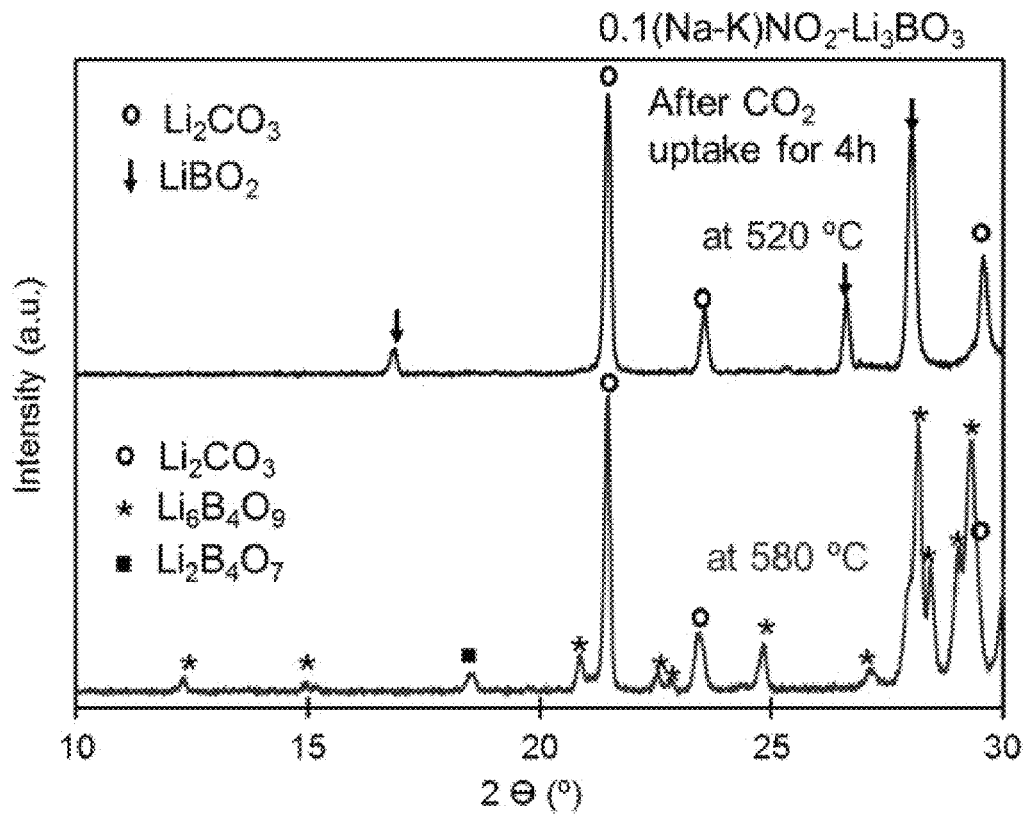
FIG. 8 shows XRD spectra of $Li_3BO_3$ mixed with 10 mol % (Na—K)$NO_2$ after reaction with $CO_2$ for 4 hours at 520° C. and 580° C.

The mixing of alkali-metal nitrites with the sequester material improved the CO$_2$ uptake by Li$_3$BO$_3$ and its reversibility dramatically. The marked effects of the alkali-metal nitrites can be ascribed to their role in mediating the reacting ion with CO$_2$ by the inter-dissolution of CO$_2$ and Li$_3$BO$_3$ in the molten salts, and the effects of the oxide precipitants generated by the thermal decomposition of the nitrite salts to prevent the sintering of the particle grains. Without wishing to be bound by any particular theory, it is believed that nitrate and/or nitrite salts can restrict the formation of a rigid impermeable surface layer of unidentate carbonates and/or the facilitation of carbonate generation. The thermal decomposition behavior of NaNO$_2$ and KNO$_2$ was examined by TGA, as shown in FIG. 7. The results indicate that NaNO$_2$ and KNO$_2$ begin to decompose at around 550° C. and 600° C., respectively. On the basis of the TGA results, it is believed that the alkali-metal oxides generated by the thermal decomposition of the nitrite salts may have coexisted with the remaining molten nitrite salts after the pre-calcination of the samples at 650° C. performed in advance of the CO$_2$ uptake measurements. The alkali-metal oxides, Na$_2$O and K$_2$O, are highly basic, and it is believed that they can react with CO$_2$ to generate the alkali-metal carbonates during the first cycle of the CO$_2$ uptake. The CO$_2$ uptake rate was enhanced more significantly by the mixing of the lithium borates with KNO$_2$ than that with NaNO$_2$. Since the fraction of the nitrites remaining after the pre-calcination for KNO$_2$ was much higher than that for NaNO$_2$, it is believed that the improvement of the uptake rate might be attributed to the existence of the nitrites. The increase in the uptake rate by the nitrite salts contributed to the increased uptake capacity at temperatures lower than 580° C., where the uptake was restricted by the slow reaction kinetics for Li$_3$BO$_3$ in the absence of nitrite salts. The uptake capacity attained at 520° C. exceeded 11.3 mmol·g$^{-1}$, which is higher than the theoretical maximum calculated according to Equation (E1). To understand the temperature dependence of CO$_2$ uptake by Li$_3$BO$_3$ in the presence of the nitrite salts, the material compositions of the products after reaction with CO$_2$ at two different temperatures (520 and 580° C.) for 4 hours were examined by XRD, as shown in FIG. 8. The results revealed that the products generated by the reaction with CO$_2$ vary according to the reaction temperature. At 580° C., two different types of lithium borates (Li$_6$B$_4$O$_9$ and Li$_2$B$_4$O$_7$) were generated in addition to the formation of Li$_2$CO$_3$. The generation of Li$_6$B$_4$O$_9$ can be explained by the reaction in Equation (E1), which also proceeds in the case with no nitrite salts. The existence of a small amount of Li$_2$B$_4$O$_7$ in the product indicated that a side reaction,

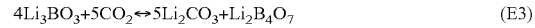

$$4Li_3BO_3 + 5CO_2 \leftrightarrow 5Li_2CO_3 + Li_2B_4O_7 \quad (E3)$$

also proceeded in the presence of the nitrite salts. In contrast, a different phase of lithium borate (LiBO$_2$) was generated at 520° C. Here, neither Li$_6$B$_4$O$_9$ nor Li$_2$B$_4$O$_7$ was included in the product. It is thought that another reaction, written as

$$Li_3BO_3 + CO_2 \leftrightarrow Li_2CO_3 + LiBO_2 \quad (E4)$$

proceeded at low temperatures. The maximum uptake capacities according to Equations (E3) and (E4) are 15.7 mmol·g$^{-1}$ and 12.6 mmol·g$^{-1}$, respectively. These values are higher than the theoretical maximum expected by Equation (E1) (9.4 mmol·g$^{-1}$). It is believed that the increase in uptake capacity on mixing of Li$_3$BO$_3$ with the nitrite salts, especially at the temperatures lower than 560° C., can be attributed to the transition of the reaction products to the lithium borates with lower lithium compositions. It is believed that the enhancement of the reaction kinetics at low temperatures by nitrite salts allowed the reaction pathways to generate higher amounts of Li$_2$CO$_3$ with the lithium borates with lower lithium compositions.

The introduction of the nitrite salts to the sequestration material make-up improved the removal rate of CO$_2$ as well. The removal appeared to be more efficient with NaNO$_2$ than with KNO$_2$ as the added nitrite. As the decomposition fraction of NaNO$_2$ into the oxides is much higher than that of KNO$_2$ during the pre-calcination process, it is believed that the improvement in the removal rate can be related to the precipitates of alkali-metal oxides and their carbonates. Since the removal of CO$_2$ can be affected by the phase isolation of the two solid products generated by the uptake of CO$_2$, it is believed that the precipitates worked as pinning centers to prevent the growth of crystal domains of the products.

The cyclic operation of CO$_2$ uptake and removal revealed that the Li$_3$BO$_3$ mixed with (Na—K)NO$_2$ showed excellent regenerability over the multiple cycles with substantially no deterioration of uptake capacity, and substantially no lowering of the reaction rate over the cycles. It is believed that the deterioration of CO$_2$ uptake by metal oxide based sequestration materials in cyclic operations is due mainly to the occurrence of particle sintering during calcination at high temperature for the removal of CO$_2$. For the case of Li$_3$BO$_3$ mixed with (Na—K)NO$_2$, it is believed that the products after the reaction with CO$_2$ coexisted with the molten nitrites and the precipitants of alkali-metal carbonates. It is believed that the coating of nitrite salts on the surface of the solid products may have prohibited intergranular coalescence during the regeneration process. In addition, it is believed that the precipitants of $Na_2CO_3$ and $K_2CO_3$ could have worked as pinning centers to prevent or inhibit the sintering of grains.

The small dependence on $CO_2$ concentration of the uptake at lower temperature is also a great advantage of $Li_3BO_3$ as a sequestration material. With decreases in the concentration of $CO_2$, the equilibrium conversion ratios for the reactions written as Equations (1), (3), and (4) are lowered, and the variations becomes more dramatic at temperatures close to the transition point of the equilibrium. The improvement in the reaction kinetics at low temperatures in the presence of the nitrite salts led to rapid and high $CO_2$ uptake at temperatures well below the transition point of the equilibrium, which resulted in the high $CO_2$ uptake with little dependence on the $CO_2$ concentration.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A sequestration material, comprising:
 a plurality of particles comprising lithium borate, wherein:
  each particle of the plurality of particles has a maximum cross-sectional dimension;
  each particle of the plurality of particles has a particle volume;
  the plurality of particles has a total particle volume defined by the total of each of the individual particle volumes;
  at least about 50% of the total particle volume is made up of particles having maximum cross-sectional dimensions of less than 100 microns; and
  at least a portion of the particles comprise $Li_3BO_3$.

2. The sequestration material of claim 1, wherein the sequestration material is capable of interacting with carbon dioxide such that at least 1.0 mmol of carbon dioxide is sequestered per gram of the sequestration material.

3. The sequestration material of claim 1, wherein the sequestration material further comprises a salt comprising nitrate and/or nitrite in combination with the lithium borate.

4. A sequestration material, comprising:
a plurality of particles comprising lithium borate; and
a salt comprising nitrate and/or nitrite in combination with the lithium borate,
wherein:
at least 1 wt % of the sequestration material is made up of the salt comprising the nitrate and/or the nitrite;
each particle of the plurality of particles has a maximum cross-sectional dimension;
each particle of the plurality of particles has a particle volume;
the plurality of particles has a total particle volume defined by the total of each of the individual particle volumes; and
at least about 50% of the total particle volume is made up of particles having maximum cross-sectional dimensions of less than 100 microns.

5. The sequestration material of claim 4, wherein the salt comprising the nitrate and/or the nitrite is a salt of an alkali metal and/or a salt of an alkaline earth metal.

6. The sequestration material of claim 5, wherein the salt comprising the nitrate and/or the nitrite is a nitrate and/or a nitrite of Na, K, Li, Rb, and/or Cs.

7. The sequestration material of claim 5, wherein the salt comprising the nitrate and/or the nitrite is a nitrate and/or a nitrite of Na and/or K.

8. The sequestration material of claim 4, wherein less than or equal to 30 wt % of the sequestration material is made up of the salt comprising the nitrate and/or the nitrite.

9. The sequestration material of claim 4, wherein the salt comprising the nitrate and/or the nitrite comprises a nitrite.

10. The sequestration material of claim 9, wherein the salt comprising the nitrate and/or the nitrite comprises $KNO_2$ and/or $NaNO_2$.

11. The sequestration material of claim 4, wherein the lithium borate comprises $Li_3BO_3$.

12. The sequestration material of claim 4, wherein the sequestration material is capable of interacting with carbon dioxide such that at least 1.0 mmol of carbon dioxide is sequestered per gram of the sequestration material.

13. A sequestration material, comprising:
a plurality of particles comprising $Li_3BO_3$, wherein:
the sequestration material is capable of interacting with carbon dioxide such that at least 1.0 mmol of carbon dioxide is sequestered per gram of the sequestration material;
each particle of the plurality of particles has a maximum cross-sectional dimension;
each particle of the plurality of particles has a particle volume;
the plurality of particles has a total particle volume defined by the total of each of the individual particle volumes; and
at least about 50% of the total particle volume is made up of particles having maximum cross-sectional dimensions of less than 100 microns.

14. The sequestration material of claim 13, wherein the sequestration material further comprises a salt comprising nitrate and/or nitrite in combination with the $Li_3BO_3$.

* * * * *